US012157306B2

(12) United States Patent
Sugiura et al.

(10) Patent No.: US 12,157,306 B2
(45) Date of Patent: Dec. 3, 2024

(54) LIQUID DISCHARGE APPARATUS, LIQUID DISCHARGE METHOD, AND STORAGE MEDIUM

(71) Applicants: Takahiko Sugiura, Kanagawa (JP); Takayuki Ito, Kanagawa (JP); Kenji Kamei, Kanagawa (JP); Taito Omura, Kanagawa (JP); Hikaru Fukazawa, Kanagawa (JP)

(72) Inventors: Takahiko Sugiura, Kanagawa (JP); Takayuki Ito, Kanagawa (JP); Kenji Kamei, Kanagawa (JP); Taito Omura, Kanagawa (JP); Hikaru Fukazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 112 days.

(21) Appl. No.: 17/965,776

(22) Filed: Oct. 14, 2022

(65) Prior Publication Data

US 2023/0191777 A1 Jun. 22, 2023

(30) Foreign Application Priority Data

Dec. 22, 2021 (JP) ................................ 2021-208528

(51) Int. Cl.

| | |
|---|---|
| ***B41J 2/045*** | (2006.01) |
| ***B05B 1/14*** | (2006.01) |
| ***B05B 12/08*** | (2006.01) |
| ***B05B 13/04*** | (2006.01) |
| ***B05D 1/26*** | (2006.01) |

(52) U.S. Cl.

CPC ............... *B41J 2/0451* (2013.01); *B05B 1/14* (2013.01); *B05B 12/084* (2013.01); *B05D 1/26* (2013.01); *B05B 13/04* (2013.01); *B05B 13/0431* (2013.01)

(58) Field of Classification Search

CPC ...... B41J 2/0451; B41J 2/2128; B41J 2/2142; B41J 2/01; B41J 29/393; B05B 1/14; B05B 12/084; B05B 13/04; B05B 13/0431; B05D 1/26

See application file for complete search history.

(56) References Cited

U.S. PATENT DOCUMENTS

2020/0079123 A1 3/2020 Yoshikawa

FOREIGN PATENT DOCUMENTS

| | | |
|---|---|---|
| JP | 2008-143044 | 6/2008 |
| JP | 2008168207 A | 7/2008 |
| JP | 2017-047613 | 3/2017 |
| JP | 2021-011071 | 2/2021 |

OTHER PUBLICATIONS

European Search Report; Application 22209082.1; May 16, 2023.

*Primary Examiner* — Lisa Solomon
(74) *Attorney, Agent, or Firm* — Duft & Bornsen, PC

(57) ABSTRACT

A liquid discharge apparatus to apply liquid to an application surface includes a head and processing circuitry. The head applies the liquid discharged from a nozzle to the application surface. The processing circuitry outputs abnormal discharge information of the nozzle. The abnormal discharge information is detected based on a shape of the liquid applied to the application surface.

20 Claims, 15 Drawing Sheets

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2021-208528, filed on Dec. 22, 2021, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing program code.

Related Art

In the related art, a liquid discharge apparatus is known to detect an abnormal discharge of a nozzle, based on liquid discharged from the nozzle of a head and applied to an application surface of the head.

As the above-described liquid discharge apparatus, an apparatus is known in which an image formed on an application surface by liquid discharged from a nozzle is read by a reading unit, and an abnormal discharge of the nozzle is detected based on the reading result.

SUMMARY

Embodiments of the present disclosure described herein provide a novel liquid discharge apparatus including a head and processing circuitry. The liquid discharge apparatus applies liquid to an application surface. The head applies the liquid discharged from a nozzle to the application surface. The processing circuitry outputs abnormal discharge information of the nozzle. The abnormal discharge information is detected based on a shape of the liquid applied to the application surface.

Embodiments of the present disclosure described herein provide a novel liquid discharge method to be executed by a liquid discharge apparatus that applies liquid to an application surface. The liquid discharge method includes applying and outputting. The applying applies the liquid discharged from a nozzle to the application surface by a head. The outputting outputs abnormal discharge information of the nozzle by a processing circuitry. The abnormal discharge information is detected based on a shape of the liquid applied to the application surface.

Embodiments of the present disclosure described herein provide a novel non-transitory, computer-readable storage medium storing computer-readable program code that causes a liquid discharge apparatus that applies liquid to an application surface, to perform applying and outputting.

The applying applies the liquid discharged from a nozzle to the application surface by a head. The outputting outputs abnormal discharge information of the nozzle by processing circuitry. The abnormal discharge information is detected based on a shape of the liquid applied to the application surface.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
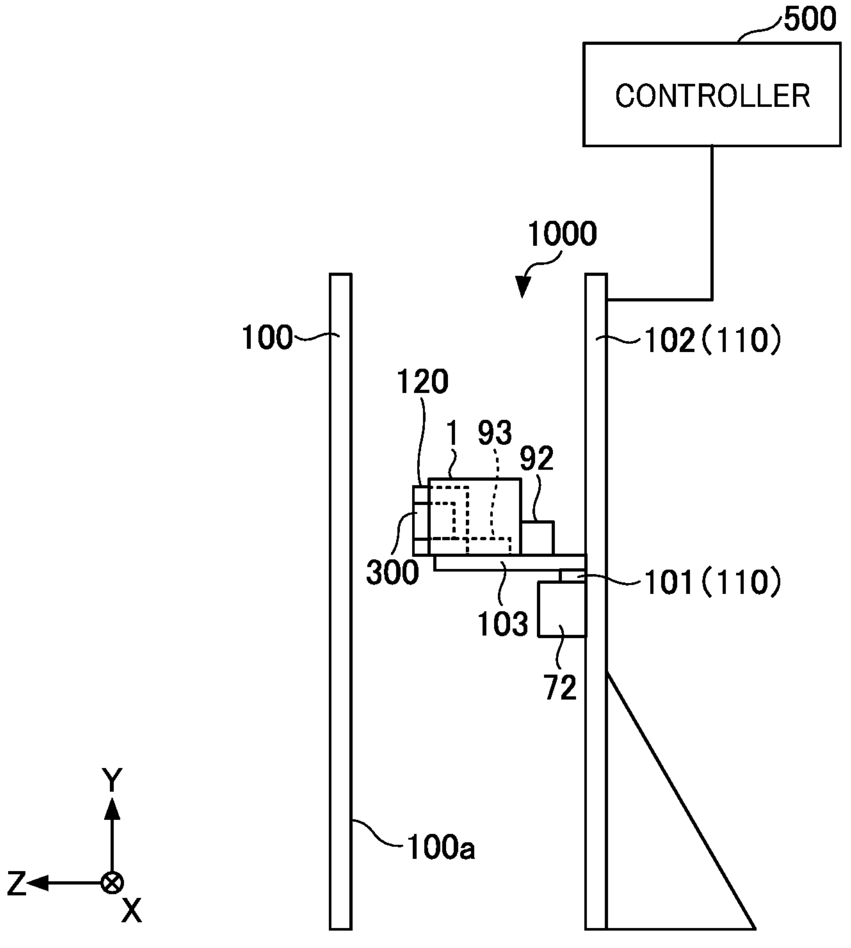
FIG. 1 is a side view illustrating an overall configuration of a liquid discharge apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a liquid discharge apparatus according to embodiments of the present disclosure are described in detail with reference to the drawings. However, the embodiments described below are some examples of the liquid discharge apparatus for embodying the technical idea of the present disclosure, and the embodiments of the present disclosure are not limited to the embodiments described below. Further, the size, material, and shape of components and the relative positions of the arranged components are given by way of example in the following description, and the scope of the present disclosure is not limited thereto unless particularly specified. Note that the size of these elements and the relative positions of these elements may be exaggerated for purposes of illustration in the drawings. In the description given below with reference to the drawings, like reference signs denote like elements, and overlapping description may be simplified or omitted as appropriate.

In the drawings illustrated below, directions may be indicated by X-axis, Y-axis, and Z-axis. An X-direction along the X-axis indicates a main scanning direction which is a moving direction of a carriage provided for the liquid discharge apparatus according to embodiments of the present disclosure. A Y direction along the Y-axis indicates a sub-scanning direction intersecting the main scanning direction. A Z direction along the Z-axis indicates a direction intersecting each of the X direction and the Y direction.

A direction in which an arrow points in the X direction is denoted as +X direction, and a direction opposite to the +X direction is denoted as −X direction. A direction in which an arrow points in the Y direction is denoted as +Y direction, and a direction opposite to the +Y direction is denoted as −Y direction. A direction in which an arrow points in the Z direction is referred to as a +Z direction, and a direction opposite to the +Z direction is denoted as a −Z direction. In the embodiments of the present disclosure, the liquid discharge apparatus discharges liquid in the +Z direction as an example. However, the above-described directions do not limit the orientation of the liquid discharge apparatus in use, and the liquid discharge apparatus may be oriented in any direction.

EMBODIMENTS

Overall Configuration Example of Liquid Discharge Apparatus 1000

Figure 2:
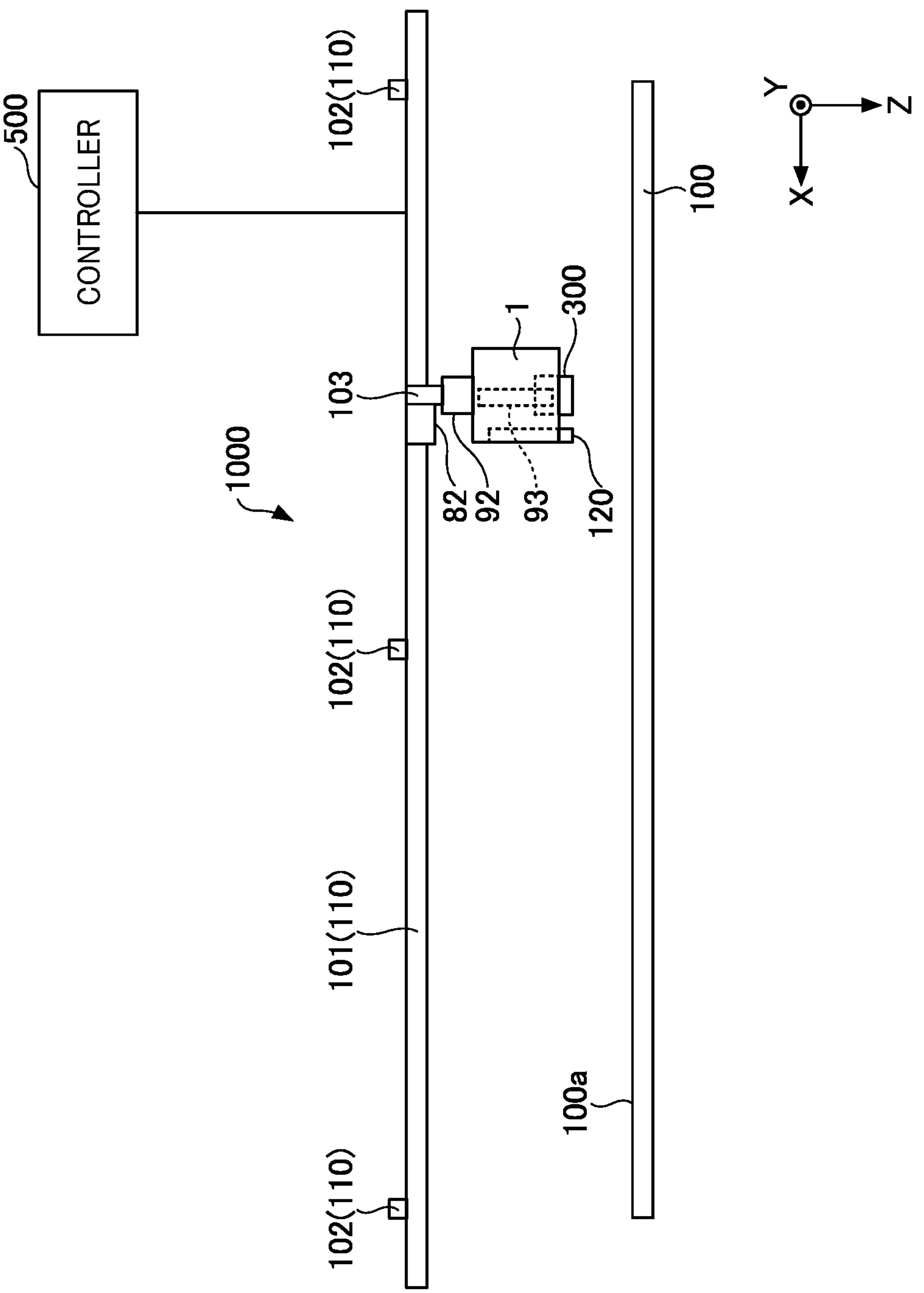
FIG. 2 is a front view illustrating the overall configuration of the liquid discharge apparatus according to embodiments of the present disclosure.

The configuration of a liquid discharge apparatus 1000 according to embodiments of the present disclosure is described with reference to FIGS. 1 and 2. FIGS. 1 and 2 are views illustrating an overall configuration of the liquid discharge apparatus 1000. FIG. 1 is a side view and FIG. 2 is a front view.

The liquid discharge apparatus 1000 applies ink, which is an example of liquid, to an application surface 100*a* of an object 100. The applied ink is fixed to the application surface 100*a* after the ink dries. Either a continuous discharge type or a droplet discharge type can be applied to a discharge method of the liquid discharge apparatus 1000.

The application surface 100*a* of the object 100 is not particularly limited, and examples of the application surface 100*a* include non-permeable surfaces such as bodies of cars, trucks, and airplanes. The term "non-permeable" refers to a characteristic that liquid applied to the application surface 100*a* of the object 100 does not permeate into the inside of the object 100. The liquid discharge apparatus 1000 can coat or paint a body of a car, a truck, or an aircraft by applying ink to the body. FIG. 1 illustrates the application surface 100*a* in a flat shape, along each of the X direction and the Y direction.

The application surface 100*a* is not limited to a surface having non-permeability and may be a surface having permeability. The application surface 100*a* is not limited to a flat surface and may be a curved surface. The use of the liquid discharge apparatus 1000 is not limited to coating or painting and may be a use in which an image is formed (or printed) with ink on a recording medium such as a sheet or a film.

As illustrated in FIGS. 1 and 2, the liquid discharge apparatus 1000 includes a head 300, a movement mechanism 110, a sensor 120, and a controller 500. In the liquid discharge apparatus 1000, the head 300 is disposed to face the application surface 100*a* of the object 100.

The head 300 has a plurality of nozzles arranged at predetermined intervals in the Y direction, and applies ink discharged from each of the nozzles to the application surface 100*a*. The head 300 is disposed on a carriage 1. However, the head 300 may not have a plurality of nozzles and may have one nozzle.

The movement mechanism 110 is a mechanism that relatively moves the head 300 and the application surface 100*a* along the surface of the application surface 100*a*. In the present embodiment, the movement mechanism 110 relatively moves the head 300 and the application surface 100*a* in each of the X direction and the Y direction along the surface of the application surface 100*a*. The movement mechanism 110 includes an X-axis rail 101 and a Y-axis rail 102.

A Z-axis rail 103 holds the carriage 1 so that the carriage 1 can move in the Z direction. The X-axis rail 101 holds the Z-axis rail 103 such that the Z-axis rail 103 holding the carriage 1 is movable in the X direction. The Y-axis rail 102 holds the X-axis rail 101 such that the X-axis rail 101 is movable in the Y-direction.

A Z-direction driver 92 moves the carriage 1 in the Z direction along the Z-axis rail 103. A X-direction driver 72 moves the Z-axis rail 103 in the X direction along the X-axis rail 101. A Y-direction driver 82 moves the X-axis rail 101 in the Y direction along the Y-axis rail 102. Note that the movement of the carriage 1 and the head 300 in the Z direction may not be parallel to the Z direction and may be an oblique movement as long as the movement includes at least a component in the Z direction.

The sensor 120 outputs the shape information of the ink discharged from the nozzle included in the head 300 and applied to the application surface 100*a*. The sensor 120 is disposed on the carriage 1 side by side with the head 300 along the X direction.

The shape of the ink is, for example, a three-dimensional shape having axes in the X direction, the Y direction, and the Z direction. The ink shape information includes information indicating the shape of the ink or information related to the shape of the ink. In the present embodiment, the shape information of the ink includes information on the height of the ink with respect to the application surface 100*a*. In other words, the shape information of the ink includes information of the length along the approximate Z-direction of the ink with respect to the application surface 100*a*.

The sensor 120 is an image sensor that projects light having a stripe pattern toward the ink applied to the application surface 100*a*, and outputs shape information of the ink acquired based on a captured image obtained by capturing the projected stripe pattern. The sensor 120 is configured to output the shape information of the ink to the controller 500.

The stripe pattern is a pattern in which line lights extending in a predetermined stripe extending direction are arranged in a direction substantially orthogonal to the stripe extending direction. When such a stripe pattern is projected toward the ink applied to the application surface 100*a*, for example, at least a part of the line lights may be bent according to the shape of the ink on which the stripe pattern is projected, thereby distorting the stripe pattern. The sensor 120 performs image processing on the captured image to acquire shape information of the ink from distortion of the stripe pattern. A Fourier transform analysis method or a moire interference analysis method may be applied to the image processing.

The light projected by the sensor 120 is not limited to light having a stripe pattern and may have various patterns such as a lattice pattern and a dot array pattern as long as the patterns are predetermined patterns.

The sensor 120 is not limited to an image sensor and may be an optical sensor that irradiates the ink applied to the application surface 100*a* with light such as laser light and measures the shape of the ink based on reflection of the irradiated light by the ink. Various types of optical sensors such as a triangulation method and a knife edge method may be applied to such an optical sensor. However, when an image sensor is used as the sensor 120, the shape of the ink based on one captured image can be measured, which is more preferable in terms of high speed of detection and simplicity of a detection operation.

The sensor 120 may not be disposed side by side with the head 300 along the X direction on the carriage 1. In addition, the position of the sensor 120 to be disposed is not limited to the carriage 1 on which the head 300 is disposed and may be another carriage provided separately from the carriage 1.

Further, the present embodiment exemplifies a configuration in which the sensor 120 includes a computing unit and image processing of a captured image is performed by the computing unit. However, embodiments of the present disclosure are not limited to such a configuration. For example, the sensor 120 may output the captured image as the shape information of the ink to the controller 500, and the controller 500 may acquire the shape information of the ink by image processing. In a case where the sensor 120 is an optical sensor, the sensor 120 may output an electric signal based on the light intensity of the light reflected by the ink to the controller 500 as the shape information of the ink, and then the controller 500 may acquire the shape information of the ink based on the electric signal.

The controller 500 controls an operation of ink discharge to the application surface 100*a* by the liquid discharge apparatus 1000. The controller 500 is configured by a processor or an electric circuit mounted on an electric board. The controller 500 is electrically connected to at least each driver that drives the movement mechanism 110 and the head 300 in a wired or wireless manner. However, the electric board on which the controller 500 is mounted is arranged in any position, and the electric board may be arranged remotely with respect to the head 300.

The liquid discharge apparatus 1000 discharges ink from the head 300 toward the application surface 100*a* while moving the carriage 1 in each of the X direction, the Y direction, and the Z direction to apply the ink to the application surface 100*a*.

More specifically, the liquid discharge apparatus 1000 discharges the ink from the head 300 and applies the ink to the application surface 100*a* while relatively moving the head 300 and the application surface 100*a* in the X direction which is the main scanning direction.

After one relative movement in the X direction is completed, the liquid discharge apparatus 1000 relatively moves the head 300 and the application surface 100*a* in the Y direction which is the sub-scanning direction. After one relative movement in the Y direction is completed, the liquid discharge apparatus 1000 discharges ink from the head 300 while relatively moving the head 300 and the application surface 100*a* in the X direction again, to apply the ink to the application surface 100*a*. The liquid discharge apparatus 1000 repeats such relative movement in the X direction and the Y direction to apply ink to the application surface 100*a*.

In a case where the application surface 100*a* is a flat object along the X direction and the Y direction, the liquid discharge apparatus 1000 does not perform relative movement between the head 300 and the application surface 100*a* in the Z direction during the ink application operation. In a case where the application surface 100*a* has a shape in which the height differs in the Z direction, the liquid discharge apparatus 1000 performs relative movement between the head 300 and the application surface 100*a* in the Z direction according to the shape of the application surface 100*a* during the ink application operation.

Example of Hardware Configuration of Controller 500

Figure 3:
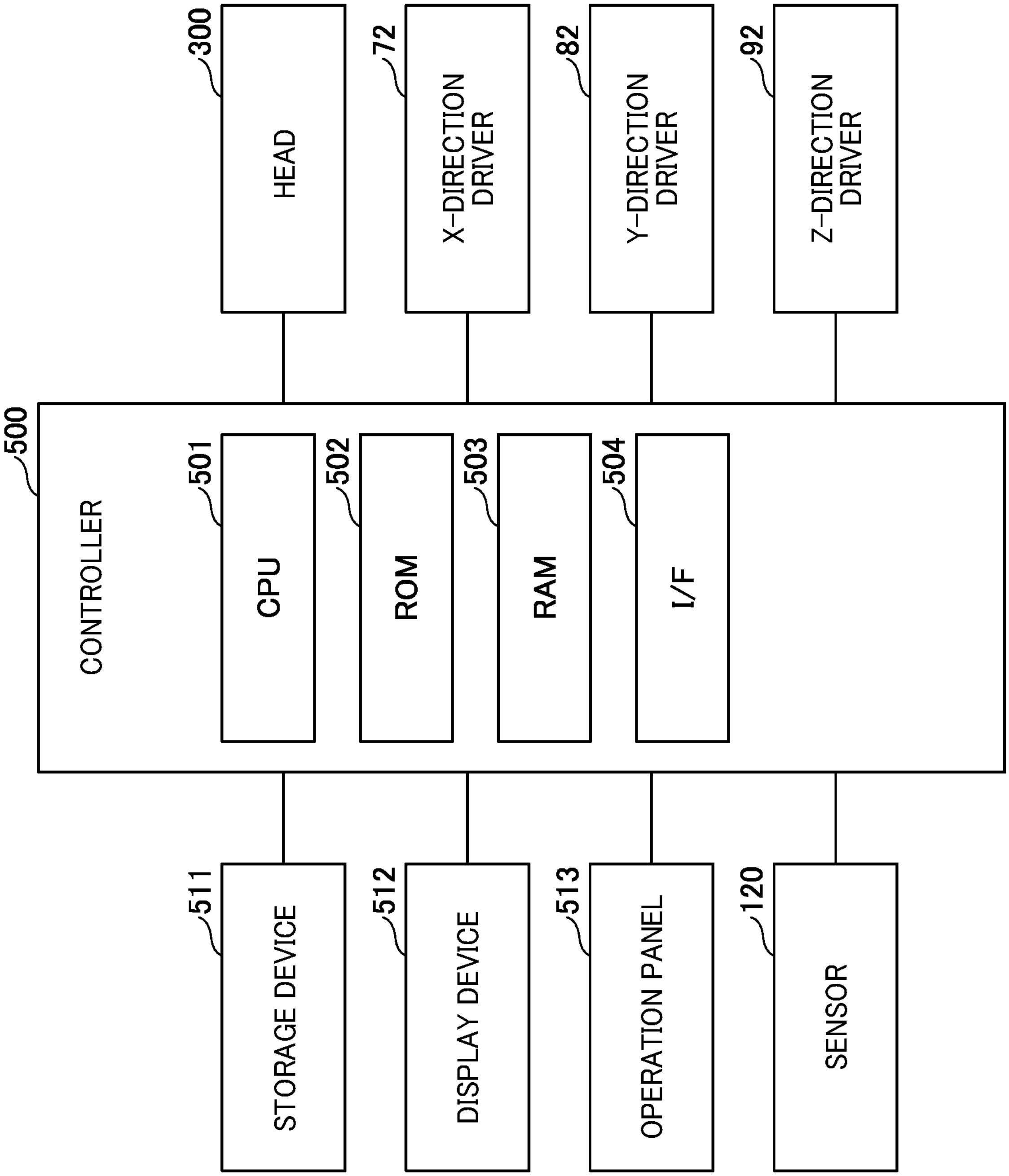
FIG. 3 is a diagram illustrating a hardware configuration of a controller according to embodiments of the present disclosure.

FIG. 3 is a block diagram illustrating an example of the hardware configuration of the controller 500 included in the liquid discharge apparatus 1000. The controller 500 includes a central processing unit (CPU) 501, a read only memory (ROM) 502, a random-access memory (RAM) 503, and an interface (I/F) 504. These units and components are electrically connected to each other through a system bus. The controller 500 is configured by, for example, a computer.

The controller 500 is electrically connected to the head 300, the X-direction driver 72, the Y-direction driver 82, the Z-direction driver 92, a storage device 511, a display device 512, an operation panel 513, and the sensor 120.

The CPU 501 uses the RAM 503 as a work area and executes a program stored in the ROM 502 to control the overall operation of the controller 500.

The ROM 502 is a non-volatile memory that stores a program for executing control such as a recording operation to the CPU 501 and stores other fixed data.

The RAM 503 is a volatile memory that temporarily stores, for example, patterns and characters to be drawn on the application surface 100*a* and shape information of the body of the object 100.

The I/F 504 is an interface that enables communication between an external apparatus such as a host personal computer (PC) and the controller 500.

The storage device 511 is an external storage device such as a hard disk drive (HDD) or a solid state drive (SSD) that stores setting values set in advance. The information stored in the storage device 511 may be read and used by the CPU 501 when the CPU 501 executes a program.

Under the control of the controller 500, the display device 512 displays, for example, a setting screen for ink application conditions and by the liquid discharge apparatus 1000 or a screen for notifying abnormal discharge of the nozzle in the head 300.

The operation panel 513 is an operation input device such as a touch screen, a keyboard, or a mouse that receives an operation of the liquid discharge apparatus 1000. The operation panel 513 is used to input values (coordinates) for identifying an area where ink is discharged onto the application surface 100*a*, to input a movement speed of the carriage 1, to input values for identifying image information and three-dimensional coordinate information (body information) used for applying ink onto the application surface 100*a*, and to input a distance between the head 300 and the application surface 100*a*.

Note that the display device 512 and the operation panel 513 may be integrated into a single screen such as a touch screen.

The X-direction driver 72 drives the carriage 1 in the X direction based on instructions from the controller 500. The Y-direction driver 82 drives the carriage 1 in the Y direction based on instructions from the controller 500. The Z-direction driver 92 drives the carriage 1 in the Z direction based on instructions from the controller 500.

The controller 500 controls the operations of the X-direction driver 72 and the Y-direction driver 82 to control the movement of the carriage 1 in the X direction and the Y direction, in which the head 300 and the sensor 120 are included. In addition, the controller 500 controls the movement of the head 300 in the Z direction with respect to the carriage 1 by controlling the operation of the Z-direction driver 92. Further, the controller 500 controls discharge of ink from the head 300.

Configuration Example of Supply Unit 200

Figure 4:
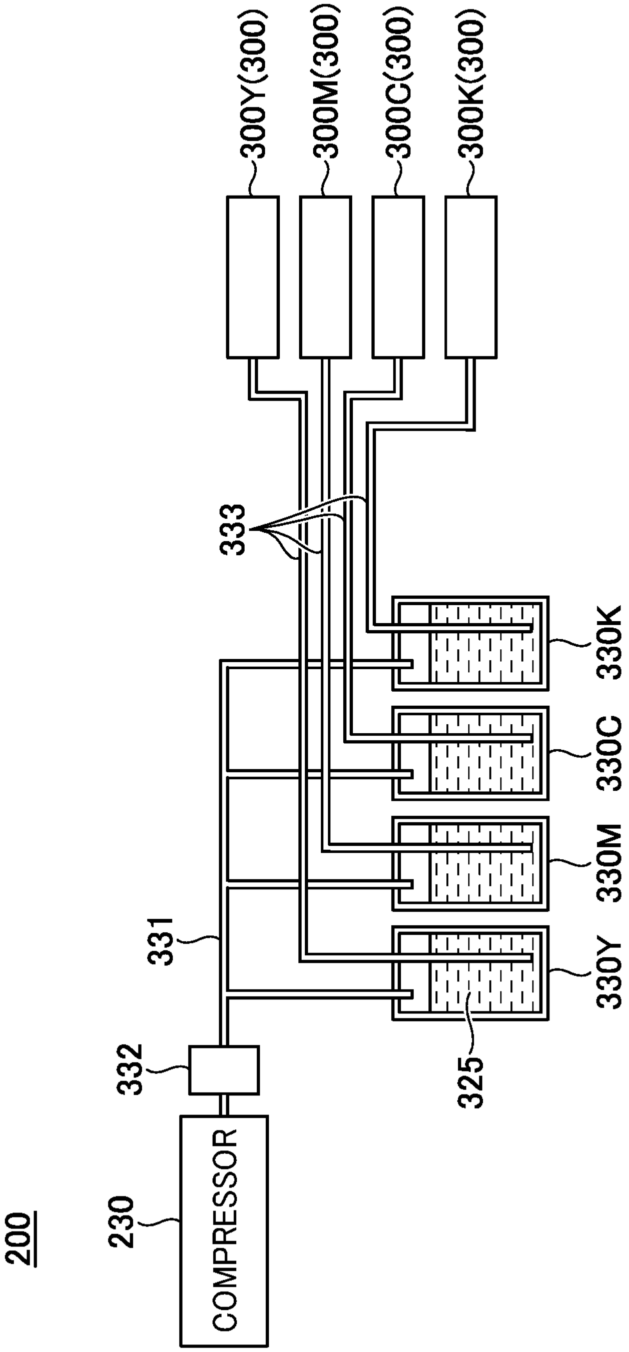
FIG. 4 is a diagram illustrating a configuration of a supply unit according to embodiments of the present disclosure.

FIG. 4 is a diagram illustrating an example of the configuration of a supply unit 200 of the liquid discharge apparatus 1000. The supply unit 200 supplies ink to the head 300.

The head 300 includes a head 300Y that discharges yellow (Y) ink, a head 300M that discharges magenta (M) ink, a head 300C that discharges (C) ink, and a head 300K that discharges black (K) ink. In a case where the heads 300Y, 300M, 300C, and 300K are not distinguished from each other, the heads 300Y, 300M, 300C, and 300K are collectively referred to as the heads 300 in the description below.

The heads 300 may further include another head, such as a head 300Q that discharges overcoating ink and a head 300P that discharges primer ink or white ink. The supply unit 200 supplies ink of each color to the head 300 of each color.

The supply unit 200 includes ink tanks 330Y, 330M, 330C, and 330K (hereinafter referred to as ink tanks 330 unless distinguished) as sealed containers that store inks 325 of magenta, cyan, yellow, and black to be discharged from the heads 300M, 300C, 300Y, and 300K, respectively. The ink tank 330 and an ink inlet (supply port) of the head 300 are connected to each other through a tube 333 so that ink 325 flows.

On the other hand, the ink tank 330 is connected to a compressor 230 through a pipe 331 including an air regulator 332, and the compressor 230 supplies pressurized air. Accordingly, the pressurized ink 325 of each color is supplied to the ink inlet of each head 300, and the liquid discharge apparatus 1000 discharges the ink 325 from each nozzle of the head 300.

Configuration Example of Head 300

Figure 5:
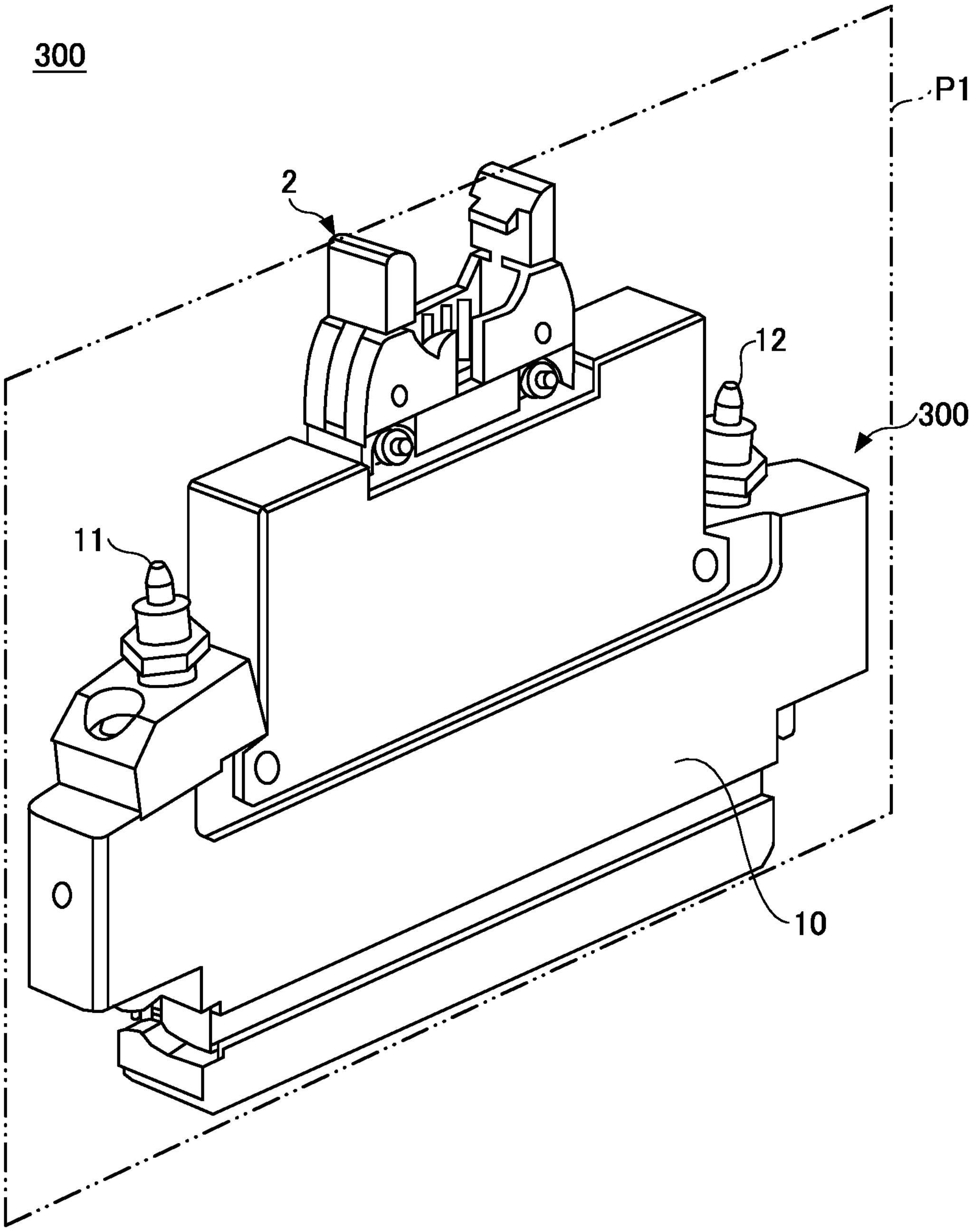
FIG. 5 is a perspective view illustrating a configuration of a head according to embodiments of the present disclosure.
Figure 6:
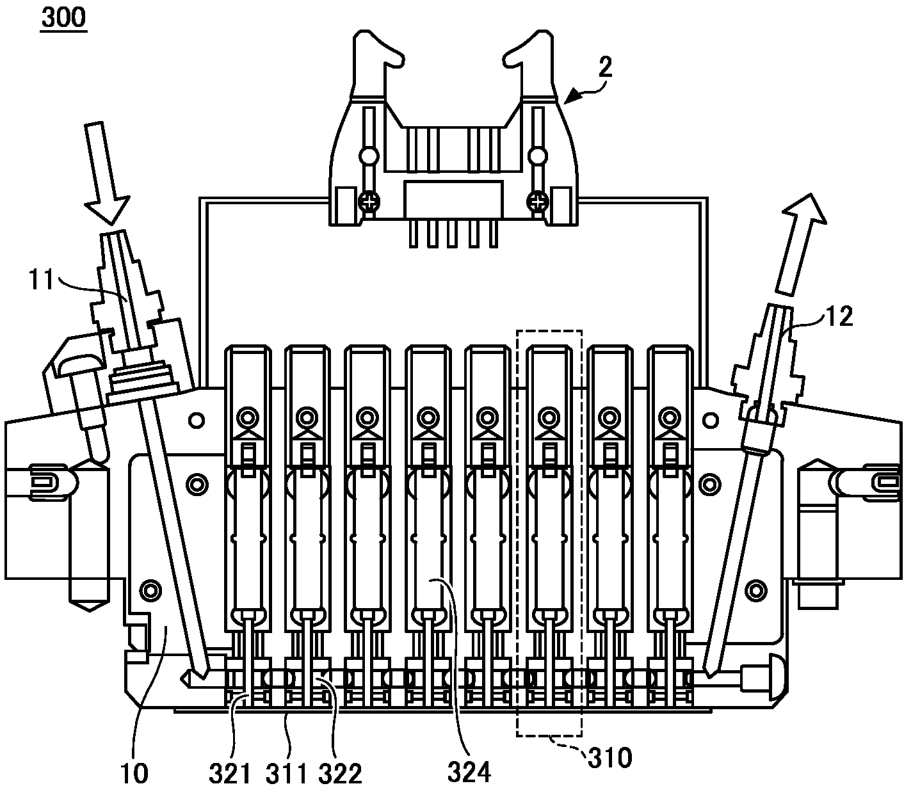
FIG. 6 is a cross-sectional view of the head cut by a plane P1 of FIG. 5.

FIGS. 5 and 6 are schematic views illustrating an example of the configuration of the head 300. FIG. 5 is a perspective view of the head 300, and FIG. 6 is a cross-sectional view of the head 300 cut by a plane P1 of FIG. 5.

The head 300 includes a plurality of discharge modules 310 arranged in one or a plurality of rows in a housing 10.

The head 300 includes a supply port 11 and a collection port 12. The supply port 11 supplies pressurized ink from the outside to each discharge module 310, and the collection port 12 sends out non-discharged ink to the outside. The housing 10 is provided with a connector 2.

The discharge module 310 includes a nozzle plate 311, a channel 322, and piezoelectric elements 324. Nozzles 321 that discharge liquid are formed in the nozzle plate 311. The channel 322 communicates with the nozzles 321 to supply pressurized liquid to the nozzles 321. Each piezoelectric element 324 drives a valve body having a needle shape to open and close the nozzle 321.

The nozzle plate 311 is joined to the housing 10. The channel 322 is a channel common to the plurality of discharge modules 310 formed in the housing 10. The pressurized ink is supplied from the supply port 11, and non-discharged ink is sent out from the collection port 12. Note that the send-out of ink from the collection port 12 may be temporarily stopped to prevent a decrease in the discharging rate of ink from the nozzles 321 during a period in which ink is discharged to the application surface 100*a*.

First Embodiment

Example of Functional Configuration of Controller 500

Figure 7:
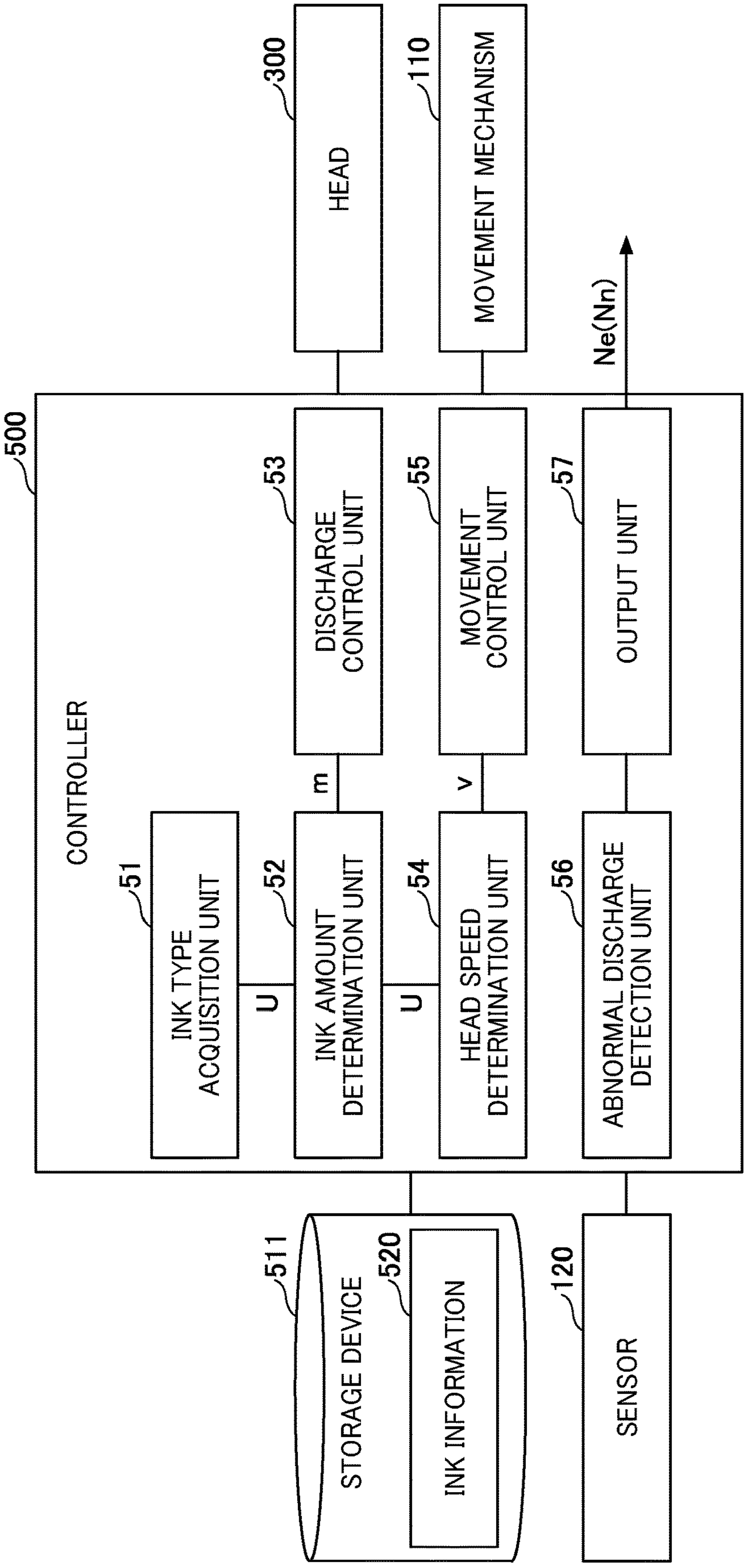
FIG. 7 is a diagram illustrating a functional configuration of a controller according to a first embodiment of the present disclosure.

FIG. 7 is a diagram illustrating an example of the functional configuration of the controller 500. The controller 500 includes an ink type acquisition unit 51, an ink amount determination unit 52, a discharge control unit 53, a head speed determination unit 54, a movement control unit 55, an abnormal discharge detection unit 56, and an output unit 57.

The controller 500 can control the operation of the liquid discharge apparatus 1000 to apply ink to the application surface 100*a*, detect an abnormal discharge of a nozzle included in the head 300, and output abnormal discharge information of the nozzle.

Specifically, the controller 500 determines an ink amount m to be discharged from the head 300 and a relative movement speed v of the head 300 with respect to the application surface 100*a* by the ink amount determination unit 52 and the head speed determination unit 54 according to the ink type information U of the ink 325 acquired by the ink type acquisition unit 51. The controller 500 controls the discharge of the ink 325 from the head 300 by the discharge control unit 53 and controls the movement of the head 300 with respect to the application surface 100*a* by the movement control unit 55 in accordance with the determined ink amount m and relative movement speed v. In addition, the controller 500 detects the abnormal discharge of the nozzles included in the head 300 by the abnormal discharge detection unit 56 based on the shape information of the ink output from the sensor 120, and outputs the information of abnormal discharge of the nozzle through the output unit 57.

The controller 500 implements the respective functions of the ink type acquisition unit 51, the ink amount determination unit 52, the discharge control unit 53, the head speed determination unit 54, the movement control unit 55, and the abnormal discharge detection unit 56 by the CPU 501 deploying a program stored in the ROM 502 to the RAM 503 and executing the program. The controller 500 implements the function of the output unit 57 by the I/F 504.

At least some of the functions of the controller 500 may be implemented by any other element than the controller 500, such as the head 300 or the sensor 120. In addition, at least some of the functions of the controller 500 may be implemented by the controller 500 and any other element than the controller 500 in a distributed manner.

The ink type acquisition unit 51 acquires the ink type information U of the ink 325 to be discharged from the head 300 by the liquid discharge apparatus 1000. The ink type acquisition unit 51 can acquire the ink type information U of the ink 325 input by a user (hereinafter, simply referred to as a user) of the liquid discharge apparatus 1000 through, for example, the operation panel 513. The ink type acquisition unit 51 may read and acquire the ink type information U of the ink 325 stored in the storage device 511 in advance. The ink type acquisition unit 51 outputs the ink type information U to the ink amount determination unit 52 and the head speed determination unit 54.

The ink amount determination unit 52 refers to ink information 520 stored in the storage device 511 based on the ink type information U of the ink 325 input from the ink type acquisition unit 51 and determines the ink amount m (amount of liquid) to be discharged from the head 300. The ink information 520 includes relation information between a predetermined type of ink and the ink amount m. The ink amount determination unit 52 outputs information of the determined ink amount m to the discharge control unit 53.

The discharge control unit 53 controls ink discharge of the ink 325 by the head 300. Particularly in the present embodiment, the discharge control unit 53 controls the ink amount m discharged from the head 300 to control the height of the ink 325 to be applied to the application surface 100*a* with respect to the application surface 100*a*.

In the case of a continuous discharge method, the discharge control unit 53 can increase the ink amount m discharged from the head 300 by lengthening the time for which the head 300 discharges the ink 325, increasing the speed at which the head 300 discharges the ink 325, or increasing the opening area of the nozzles of the head 300.

In the case of a droplet discharge method, the discharge control unit 53 can increase the ink amount m discharged from the head 300 by increasing the volume of the ink droplets formed from the ink 325 or increasing the drive voltage of the head 300. The discharge control unit 53 can increase the volume of the ink droplet, for example, by combining a plurality of ink droplets.

The relation information between the type of the ink 325 and the ink amount m includes relation information between the surface tension of the ink 325 associated with the type of the ink 325 and the ink amount m, or relation information between the viscosity of the ink 325 associated with the type of the ink 325 and the ink amount m.

The ink amount determination unit 52 determines the ink amount m to be discharged from the head 300 so that the ink amount m increases as the surface tension of the ink 325 decreases. Alternatively, the ink amount determination unit 52 determines the ink amount m to be discharged from the head 300 so that the ink amount m increases as the viscosity of the ink 325 is lower. The discharge control unit 53 can cause the head 300 to discharge the ink amount m determined by the ink amount determination unit 52.

The head speed determination unit 54 refers to ink information 520 stored in the storage device 511 based on the ink type information U of the ink 325 input from the ink type acquisition unit 51 and determines the relative movement speed v between the head 300 and the application surface 100*a*. The ink information 520 includes relation information between a predetermined type of the ink 325 and the relative movement speed v. The head speed determination unit 54 outputs information of the determined relative movement speed v to the movement control unit 55.

The movement control unit 55 controls the relative movement by the movement mechanism 110. In the present embodiment, the movement control unit 55 controls the X-direction driver 72, the Y-direction driver 82, and the Z-direction driver 92 to control the relative movement by the movement mechanism 110. In the present embodiment, the movement control unit 55 can control the height of the ink 325 to be applied to the application surface 100*a* with respect to the application surface 100*a* by controlling the relative movement speed v of the movement mechanism 110.

The head speed determination unit 54 determines the relative movement speed v so that the relative movement speed v is slow as the ink amount m discharged from the head 300 is smaller. In addition, the head speed determination unit 54 determines the relative movement speed v so that the relative movement speed v is slow as the surface tension of the ink 325 decreases. In addition, the head speed determination unit 54 determines the relative movement speed v so that the relative movement speed v is slow as the viscosity of the ink 325 is lower. The movement control unit 55 can move the head 300 with respect to the application surface 100*a* at the relative movement speed v determined by the head speed determination unit 54.

The abnormal discharge detection unit 56 detects an abnormal discharge of the nozzles based on the shape of the ink 325 applied to the application surface 100*a*. In the present embodiment, the abnormal discharge detection unit 56 detects the abnormal discharge information Ne of the nozzles based on shape information of the ink 325 output from the sensor 120. The abnormal discharge detection unit 56 outputs the detected abnormal discharge information Ne of the nozzles through the output unit 57. In the present embodiment, the abnormal discharge information Ne of the nozzles includes abnormal discharge nozzle information Nn for identifying an abnormal discharge nozzle among the plurality of nozzles.

The abnormal discharge detection unit 56 can output the abnormal discharge information Ne of the nozzle to the display device 512, for example, through the output unit 57 and display the abnormal discharge information Ne on the display device 512. Alternatively, the abnormal discharge detection unit 56 may output the abnormal discharge information Ne of the nozzles to the storage device 511 via the output unit 57 and cause the storage device 511 to store the abnormal discharge information Ne. Alternatively, the abnormal discharge detection unit 56 may transmit the abnormal discharge information Ne of the nozzles to an external device of the liquid discharge apparatus 1000.

Operation Example of Liquid Discharge Apparatus 1000

Figure 8:
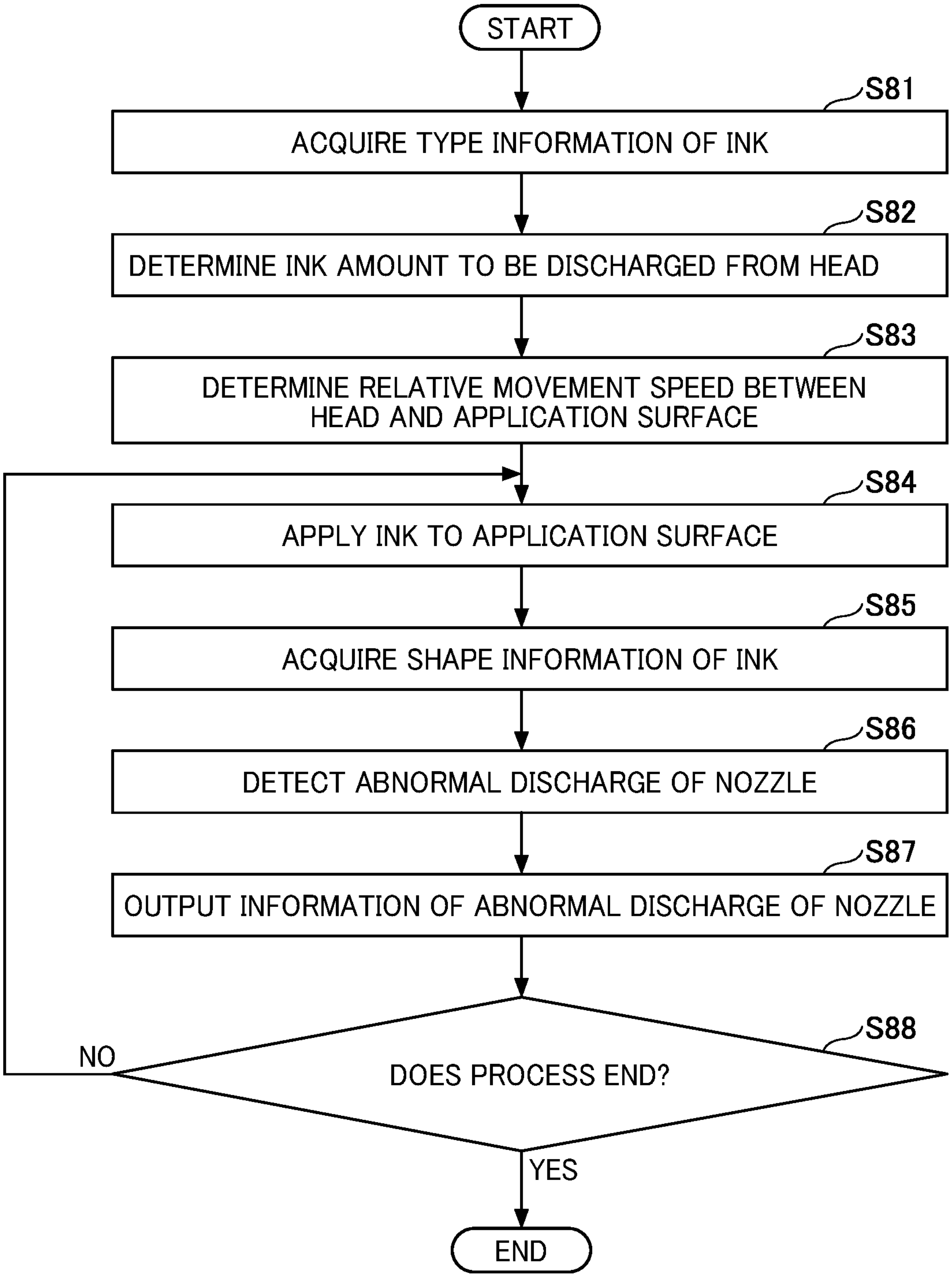
FIG. 8 is a flowchart of an operation of the liquid discharge apparatus according to the first embodiment of the present disclosure.

FIG. 8 is a flowchart of an operation of the liquid discharge apparatus 1000. FIG. 8 illustrates an operation of an abnormal discharge detection performed by the liquid discharge apparatus 1000. The liquid discharge apparatus 1000 starts the operation illustrated in FIG. 8, for example, when the liquid discharge apparatus 1000 receives an instruction of the abnormal discharge detection, input by a user through the operation panel 513.

First, in step S81, the liquid discharge apparatus 1000 acquires the ink type information U of the ink 325 to be discharged from the head 300 by the liquid discharge apparatus 1000, by the ink type acquisition unit 51. The ink type acquisition unit 51 outputs the ink type information U of the ink 325 to the ink amount determination unit 52 and the head speed determination unit 54.

Subsequently, in step S82, the liquid discharge apparatus 1000 refers to the ink information 520 stored in the storage device 511 and determines the ink amount m to be discharged from the head 300, by the ink amount determination unit 52 based on the ink type information U of the ink 325 input from the ink type acquisition unit 51. The ink amount determination unit 52 outputs information of the determined ink amount m to the discharge control unit 53.

Subsequently, in step S83, the liquid discharge apparatus 1000 refers to the ink information 520 stored in the storage device 511 based on the ink type information U of the ink 325 input from the ink type acquisition unit 51 and determines the relative movement speed v between the head 300 and the application surface 100*a* by the head speed determination unit 54. The head speed determination unit 54 outputs the determined relative movement speed information to the movement control unit 55.

Note that the processes in the steps S82 and S83 may be performed in any desired different order or may be performed in parallel.

Subsequently, in step S84, the liquid discharge apparatus 1000 causes the movement control unit 55 to control the relative movement between the head 300 and the application surface 100*a* by the movement mechanism 110 and causes the discharge control unit 53 to control the discharge of the ink 325 by the head 300. As a result, the liquid discharge apparatus 1000 applies the ink 325 to the application surface 100*a*.

Subsequently, in step S85, the liquid discharge apparatus 1000 acquires the shape information of the ink 325 applied to the application surface 100*a* from the sensor 120.

Subsequently, in step S86, the liquid discharge apparatus 1000 detects the abnormal discharge of the nozzle based on the shape of the ink 325 applied to the application surface 100*a* by the abnormal discharge detection unit 56.

Subsequently, in step S87, the liquid discharge apparatus 1000 outputs the abnormal discharge information Ne of the nozzles detected by the abnormal discharge detection unit 56 by the output unit 57.

Subsequently, in step S88, the liquid discharge apparatus 1000 determines whether the operation of the abnormal discharge detection is completed by the controller 500. The controller 500 can determine whether the operation of the abnormal discharge detection is completed based on, for example, data input by a user using the operation panel 513 or a determination result of whether the number of times of the operation of the abnormal discharge detection reaches the number of times set in advance.

In step S88, when the controller 500 determines that the operation of the abnormal discharge detection is completed (YES in step S88), the liquid discharge apparatus 1000 ends the operation of the abnormal discharge detection. In step S88, when the controller 500 determines that the operation of the abnormal discharge detection is not completed (NO in step S88), the liquid discharge apparatus 1000 processes the operation of the abnormal discharge detection after step S84 again.

Due to the above-described processing, the liquid discharge apparatus 1000 can detect the abnormal discharge of the nozzle included in the head 300.

Operation of Liquid Discharge Apparatus 1000

Example of Abnormal Discharge Detection Based on Ink Shape

Figure 9A:
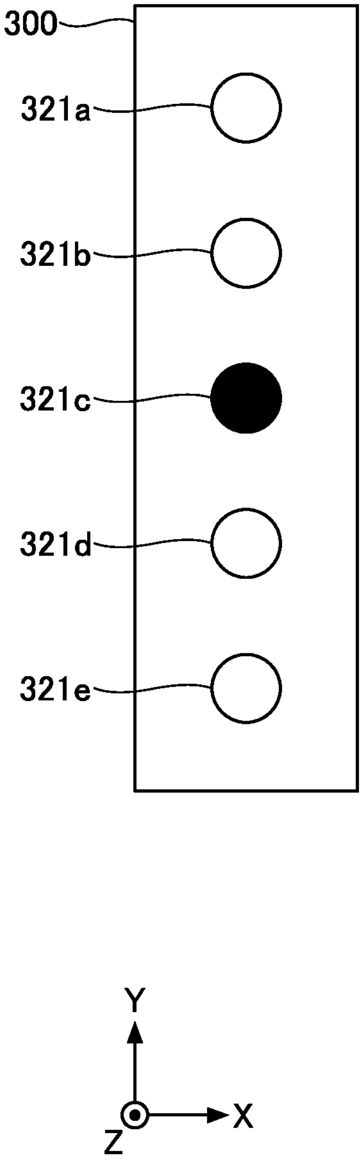
FIGS. 9A and 9B are diagrams illustrating examples of a detection of an abnormal discharge of the liquid discharge apparatus according to the first embodiment of the present disclosure.
Figure 9B:
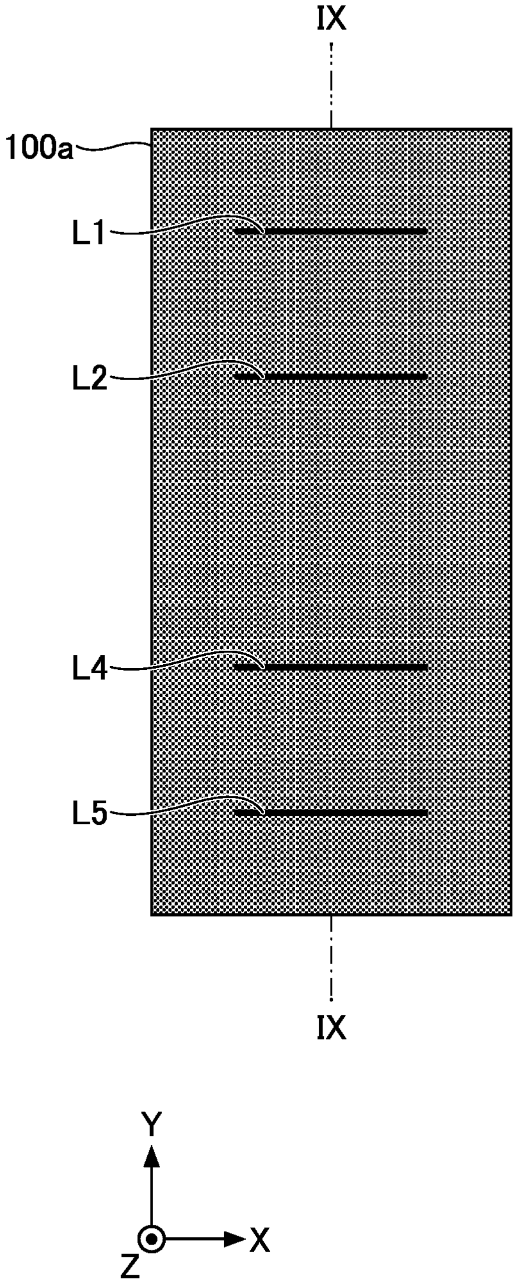
Figure 10:
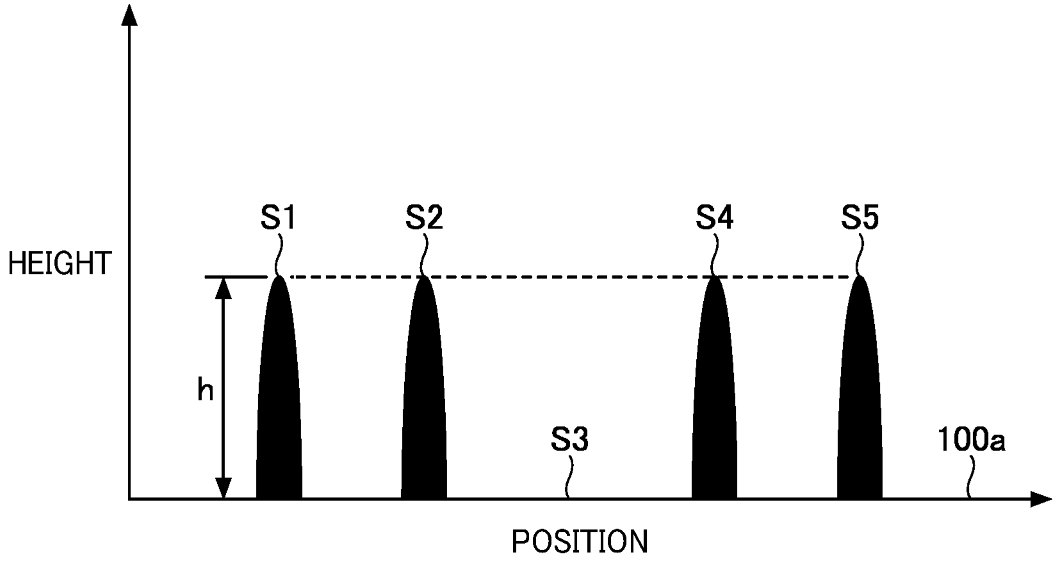
FIG. 10 is a diagram illustrating an example of a result of a cross-sectional shape detection taken along line IX-IX in FIG. 9.

FIGS. 9A, 9B and 10 are diagrams illustrating examples of a detection result of the abnormal discharge by the liquid discharge apparatus 1000. FIG. 10 is a diagram illustrating an example of a result of a cross-sectional shape detection taken along line IX-IX in FIG. 9B. FIGS. 9A and 9B illustrate nozzles 321*a* to 321*e*, which are a plurality of nozzles included in the head 300, and linear patterns L1 to L5 formed by the ink 325 discharged from the head 300 and applied to the application surface 100*a*.

In FIG. 9A, the nozzles 321*a*, 321*b*, 321*d*, and 321*e*, which are circled in white, indicate nozzles from which the ink 325 is successfully discharged, and the nozzle 321*c*, which is circled in black, indicates a non-discharge nozzle from which the ink 325 is not discharged due to an abnormal discharge.

The head 300 discharges the ink 325 from each nozzle while being moved in the X direction by the movement mechanism 110, so as to form a linear pattern extending in the X direction on the application surface 100*a* corresponding to each nozzle.

The X direction is an example of a pattern extending direction. The linear pattern extending in the X direction is an example of a predetermined pattern and is an example of a plurality of linear patterns extending in the X direction, formed on the application surface 100*a* by the ink 325 discharged from each of the plurality of the nozzles 321*a* to 321*e*.

In the example illustrated in FIG. 9B, the color of the application surface 100*a* and the color of the ink 325 are the same type of color. The same type of color indicates that the colors are close to each other in hue. The same type of color is, for example, the color of the ink 325 is black, and the color of the application surface 100*a* is gray close to black. In addition, in a case where the color of the ink 325 is white and the color of the application surface 100*a* is a cream color close to white, these colors are also the same type of color. In a case where the color of the ink 325 is red and the color of the application surface 100*a* is a dark red color, these colors are also the same type of color.

As illustrated in FIG. 9B, the linear pattern L1 is formed by the ink 325 discharged from the nozzle 321*a*, and the linear pattern L2 is formed by the ink 325 discharged from the nozzle 321*b*. In addition, the linear pattern L4 is formed by the ink 325 discharged from the nozzle 321*d*, and the linear pattern L5 is formed by the ink 325 discharged from the nozzle 321*e*. Since the nozzle 321*c* is a non-discharge nozzle, a linear pattern is not formed at a position corresponding to the nozzle 321*c* of the application surface 100*a*.

The sensor 120 measures the shape of the application surface 100*a* and the shape of the ink 325 applied to the application surface 100*a*. In the shape measured by the sensor 120, the cross-sectional shape taken along the line IX-IX in FIG. 9B is as illustrated in FIG. 10. In FIG. 10, the horizontal axis represents the position along the Y direction, and the vertical axis represents the height along the Z direction.

A shape S1 corresponds to a cross-sectional shape of the linear pattern L1, a shape S2 corresponds to a cross-sectional shape of the linear pattern L2, a shape S4 corresponds to a cross-sectional shape of the linear pattern L4, and a shape S5 corresponds to a cross-sectional shape of the linear pattern L5.

The height h of the shapes S1, S2, S4, and S5 is higher than the height of the application surface 100*a* by the amount of the ink 325 applied to the application surface 100*a*. On the other hand, since the linear pattern corresponding to the nozzle 321*c* is not formed, the height of the nozzle 321*c* corresponding to the nozzle S3 is substantially the same as the height of the application surface 100*a*. Note that the substantially same height includes a difference corresponding to noise of the sensor 120.

Based on the shape of the ink 325 applied to the application surface 100*a*, for example, when the shape is not higher than a predetermined height in an area corresponding to the position of a nozzle of the head 300 on the application surface 100*a*, the liquid discharge apparatus 1000 can detect the nozzle as an abnormal discharge nozzle.

In the examples of FIGS. 9A, 9B, and 10, a shape higher than the predetermined height is not obtained in the area corresponding to the nozzle 321*c*. As a result, the liquid discharge apparatus 1000 outputs abnormal discharge information Ne indicating that the nozzle 321*c* is an abnormal discharge nozzle. The liquid discharge apparatus 1000 can output discharge the abnormal discharge nozzle information Nn that identifies the nozzle 321*c* as an abnormal discharge nozzle among the plurality of nozzles of the head 300.

In other words, in the method of detecting abnormal discharge nozzle according to the present embodiment, the head 300 forms a linear pattern as a predetermined pattern on the application surface 100*a* with the ink 325 discharged from each of the plurality of nozzles 321*a* to 321*e*. The output unit 57 is configured to output the abnormal discharge nozzle information Nn identified based on a second position of the application surface 100*a* at which the height of the ink 325 constituting the linear pattern formed on the application surface 100*a* with respect to the application surface 100*a* is lower than the height at a first position of the application surface 100*a*. The positions of the shapes S1, S2, S4, and S5 in the Y direction in FIG. 10 correspond to the first position, and the position of the shape S3 corresponds to the second position.

Here, as a method of detecting the abnormal discharge of the nozzle according to a comparative example, for example, a method may be considered of reading the linear pattern formed on the application surface 100*a* with a camera or a scanner and detecting the abnormal discharge of the nozzle based on the read image.

However, as the example illustrated in FIG. 9B, in a case where the color of the application surface 100*a* and the color of the ink 325 are the same type of color, the contrast of the color of the applied ink 325 is low with respect to the color of the application surface 100*a*. Consequently, in the method according to the comparative example, the linear pattern in the read image may not be identified, and then the abnormal discharge may not be detected.

Figure 11:
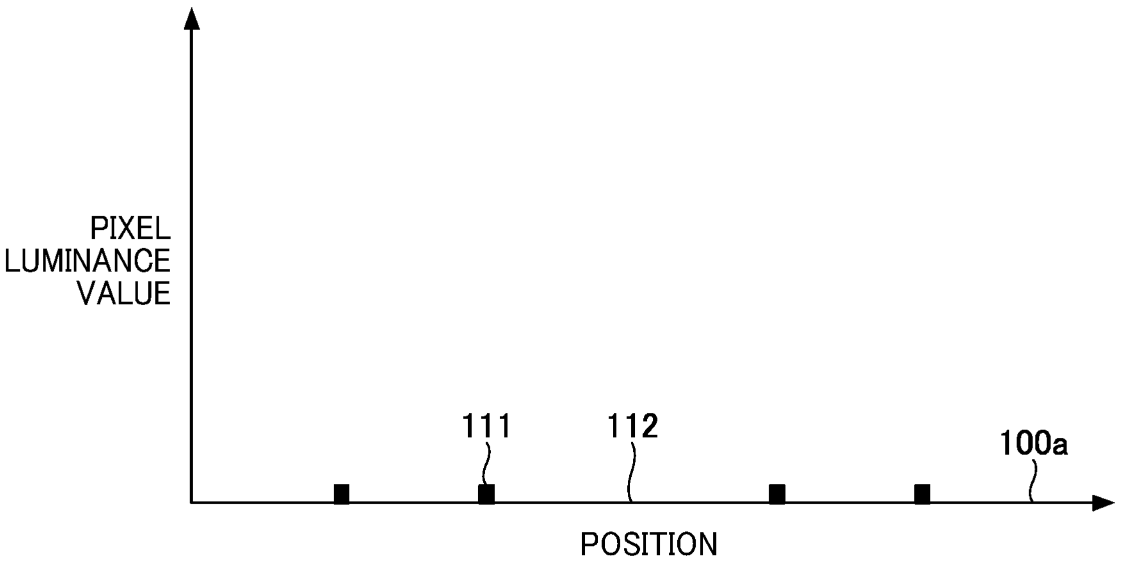
FIG. 11 is a diagram illustrating a luminance distribution of a read image along the line IX-IX in FIG. 9.

FIG. 11 is a diagram illustrating a cross-sectional luminance distribution of the linear pattern in a captured image of the linear pattern according to the comparative example. FIG. 11 is a diagram illustrating, for example, a cross-sectional luminance distribution of a read image along the line IX-IX in FIG. 9B.

In FIG. 11, the horizontal axis represents a position along the Y direction of FIG. 9B, and the vertical axis represents a pixel luminance value in the read image. The unit of the pixel luminance value is a level of gradation. In the example illustrated in FIGS. 9A and 9B, since the color of the ink 325 is darker than the color of the application surface 100*a*, the pixel luminance value of the linear pattern is lower than the pixel luminance value of the application surface 100*a*. However, in FIG. 11, for the sake of convenience, brightness and darkness of the color of the ink 325 and the application surface 100*a* are reversed, and the pixel luminance value 111 of the linear pattern is displayed to be higher than the pixel luminance value 112 of the application surface 100*a*.

As illustrated in FIG. 11, the difference is small between the pixel luminance value 111 in the area where the linear pattern is formed and the pixel luminance value 112 in the area where the linear pattern is not formed (area of the application surface 100*a*). Consequently, the method according to the comparative example cannot identify the area in which the linear pattern is not formed on the application surface 100*a*. As a result, it is difficult to detect the abnormal discharge of the nozzle.

Since the liquid discharge apparatus 1000 according to the present embodiment detects the abnormal discharge of the nozzle based on the shape of the ink 325 applied to the application surface 100*a*, the abnormal discharge of the nozzle can be detected without being affected by the contrast between the color of the application surface 100*a* and the color of the ink 325. Since the liquid discharge apparatus 1000 according to the present embodiment is not affected by the color contrast, the liquid discharge apparatus 1000 can detect the abnormal discharge of the nozzle not only in a case where the color of the application surface 100*a* and the color of the ink 325 are the same type of color but also in a case where both are the same color.

The present embodiment exemplifies a method of forming a linear pattern by discharging the ink 325 from each of the plurality of nozzles 321*a* to 321*e* and detecting a nozzle that cannot form a linear pattern as an abnormal discharge nozzle among the plurality of nozzles 321*a* to 321*e*. However, a method of detecting an abnormal discharge of a nozzle is not limited to the method described in the present embodiment. For example, in a case where the head 300 has one nozzle alone, the liquid discharge apparatus 1000 may discharge the ink 325 from the nozzle and detect an abnormal discharge of the nozzle based on whether a pattern by the discharged ink 325 is formed on the application surface 100*a*.

The predetermined pattern is not limited to a linear pattern and may be a dot pattern or a filled pattern as long as a predetermined pattern is used. The linear pattern is not limited to a pattern extending in the X direction and may be a pattern extending in the Y direction, or a pattern extending in a direction intersecting the X direction or the Y direction in the application surface 100*a*.

Control Example of Relative Movement Speed v

Next, a description is given of an operation of relatively moving the head 300 with respect to the application surface 100*a* at the relative movement speed v determined by the head speed determination unit 54.

In the present embodiment, the abnormal discharge of the nozzle is detected based on the shape of the ink 325 applied to the application surface 100*a*, in particular, the height h of the ink 325. However, the height h of the ink 325 with respect to the application surface 100*a* may not be sufficiently obtained depending on the amount m of the ink discharged from the nozzles, or the viscosity or surface tension of the ink 325. In a case where the height h of the ink 325 is not sufficient, the sensor 120 of the liquid discharge apparatus 1000 may not detect the linear pattern formed on the application surface 100*a* by the ink 325 discharged from a normal nozzle, and the abnormal discharge of the nozzle may not be accurately detected.

In the present embodiment, the movement control unit 55 controls the height of the ink 325 with respect to the application surface 100*a* by controlling the relative movement speed v of the movement mechanism 110. As a result, the height h of the ink 325 with respect to the application surface 100*a* is obtained in order to accurately detect the abnormal discharge of the nozzle.

Figure 12A:
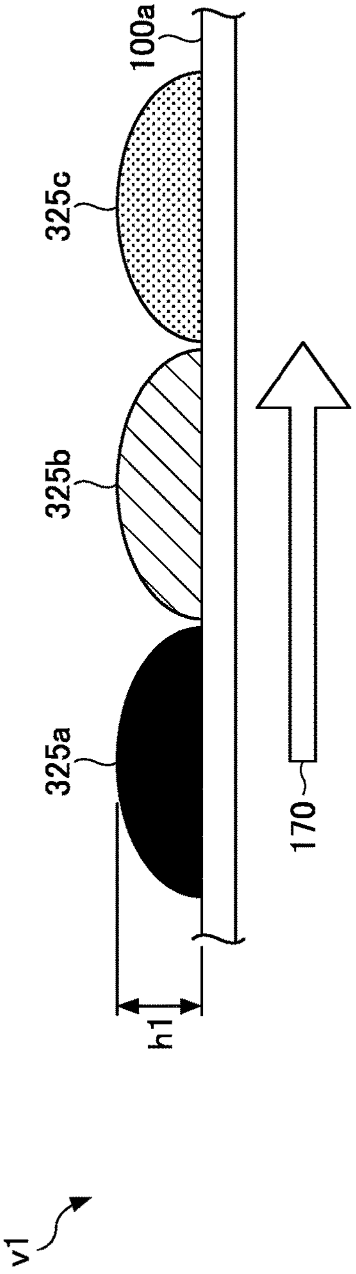
FIGS. 12A, 12B and 12C are diagrams illustrating the relation between a head relative movement speed and a height of ink.
Figure 12B:
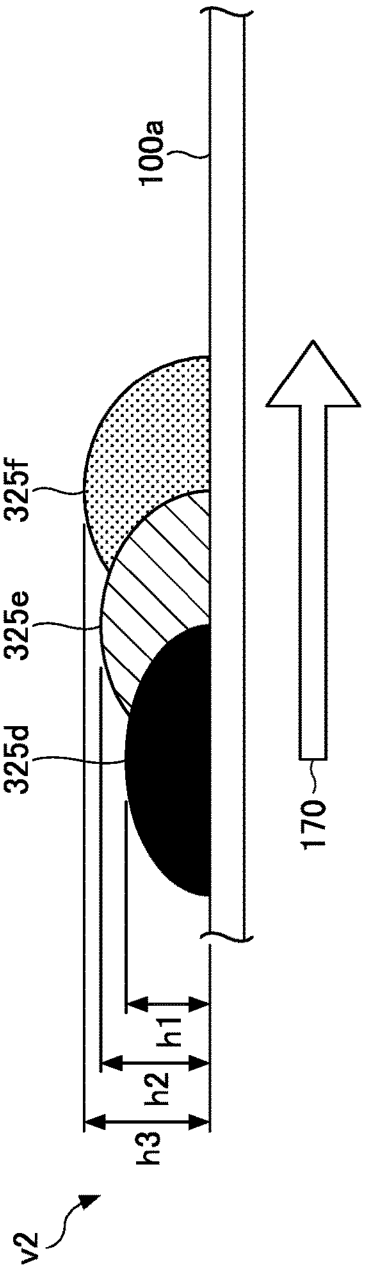
Figure 12C:
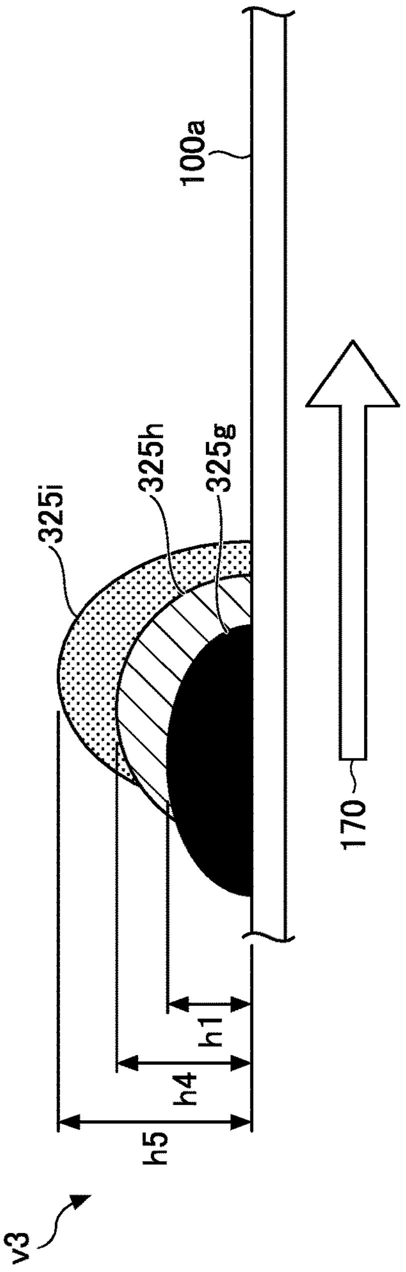

FIGS. 12A, 12B and 12C are diagrams illustrating the relation between the relative movement speed v of the head 300 and the heights of the ink 325. FIGS. 12A, 12B and 12C illustrate the heights of three droplets of the ink 325 applied to the application surface 100*a* when the three droplets of the ink 325 are discharged while moving the head 300 in the moving direction 170 at three relative movement speeds v1, v2, and v3, respectively. The relation among the relative movement speeds v1, v2, and v3 is expressed as "v1>v2>v3".

When the head 300 is moved at the relative movement speed v1, three droplets of ink 325*a*, 325*b*, and 325*c* are not overlapped, and each height of the three droplets are equal as h1.

When the head 300 is moved at the relative movement speed v2, the relative movement speed v2 is slower than the relative movement speed v1. Accordingly, the three droplets of ink 325*d*, 325*e*, and 325*f* partially overlap with each other, and the height of the ink increases by the amount of overlap. The droplet of ink 325*d* indicates the first ink droplet. The height of the droplet of the ink 325*d* is a height h1. The droplet of ink 325*e* indicates ink obtained as a result of the second droplet of ink overlapping the droplet of the ink 325*d*. By overlapping the droplets of the ink 325*d* and the ink 325*e*, the height of the droplet of ink 325*e* is a height h2 higher than the height h1. The droplet of ink 325*f* indicates ink obtained as a result of the third droplet of the ink further overlapping the droplet of the ink 325*e*. By overlapping the three droplets of ink 325*d*, 325*e* and 325*f*, the height of the droplet of the ink 325*f* is a height h3 that is even higher than the height h2.

When the head 300 is moved at the relative movement speed v3, the relative movement speed v3 is further slower than the relative movement speed v2. Accordingly, more portions of the three droplets of ink 325*g*, 325*h*, and 325*i* overlap each other compared to the case of the relative movement speed v2, and the height of the ink increases by the amount of overlap. The droplet of ink 325*g* indicates the first ink droplet. The height of the droplet of the ink 325*g* is the height h1. The droplet of ink 325*h* indicates ink obtained as a result of the second droplet of ink overlapping the droplet of the ink 325*g*. By overlapping the droplets of the ink 325*g* and the ink 325*h*, the height of the droplet of ink 325*h* is a height h4 higher than the height h1. The droplet of ink 325*i* indicates ink obtained as a result of the third droplet of the ink further overlapping the droplet of the ink 325*h*. By overlapping the three droplets of ink 325*g*, 325*h* and 325*i*, the height of the droplet of the ink 325*i* is a height h5 that is even higher than the height h4.

As described above, the liquid discharge apparatus 1000 can increase the height of the ink 325 applied to the application surface 100*a* as the relative movement speed v is decreased.

Since the height h of the ink 325 decreases as the ink amount m discharged from the head 300 decreases, the movement control unit 55 preferably decreases the relative movement speed v. In addition, as the surface tension of the ink 325 decreases, the height h of the ink 325 decreases due to the ink 325 wetting and spreading on the application surface 100*a*. For this reason, the movement control unit 55 preferably decreases the relative movement speed v. Furthermore, as the viscosity of the ink 325 is lower, the height h of the ink 325 decreases due to the ink 325 spreading on the application surface 100*a*. For this reason, the movement control unit 55 preferably decreases the relative movement speed v. Accordingly, the liquid discharge apparatus 1000 can obtain the height h of the ink 325 with respect to the application surface 100*a* in order to accurately detect the abnormal discharge of the nozzle.

Example of Abnormal Discharge Detection Other than Non-Discharge

In the example described above, the example of detecting non-discharge of the nozzle among the abnormal discharges has been described, however, the abnormal discharge which is detectable by the liquid discharge apparatus 1000 is not limited to the non-discharge of the nozzle. For example, in addition to the non-discharge of the nozzle, the liquid discharge apparatus 1000 can detect an ink amount abnormality in which the ink amount m discharged from the nozzle deviates from a predetermined amount, and an ink discharge direction abnormality in which the direction of ink discharged from the nozzle deviates from a predetermined discharge direction.

Figure 13:
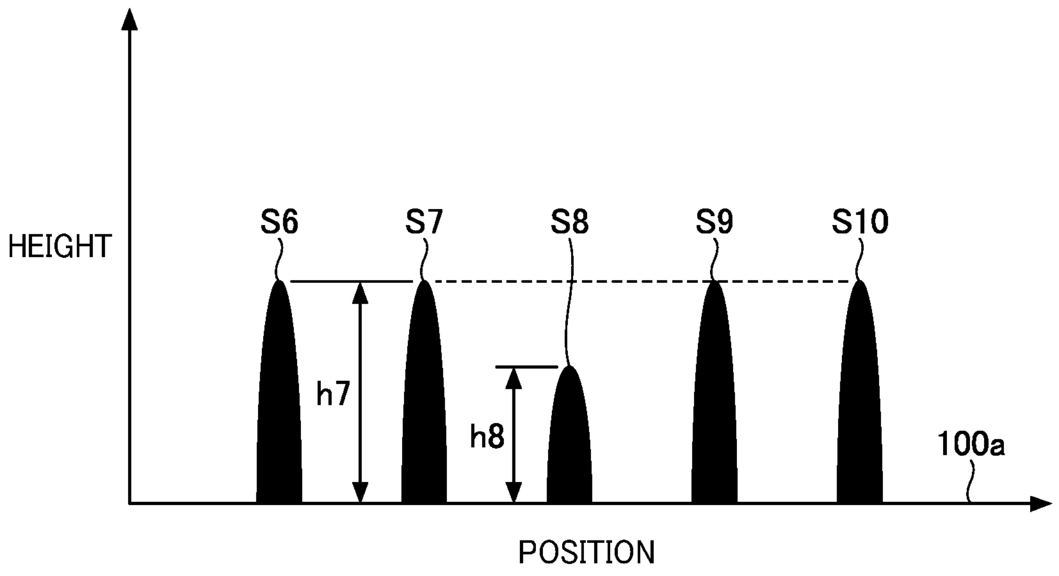
FIG. 13 is a diagram illustrating another first example of the detection of the abnormal discharge of the liquid discharge apparatus according to the first embodiment of the present disclosure.
Figure 14:
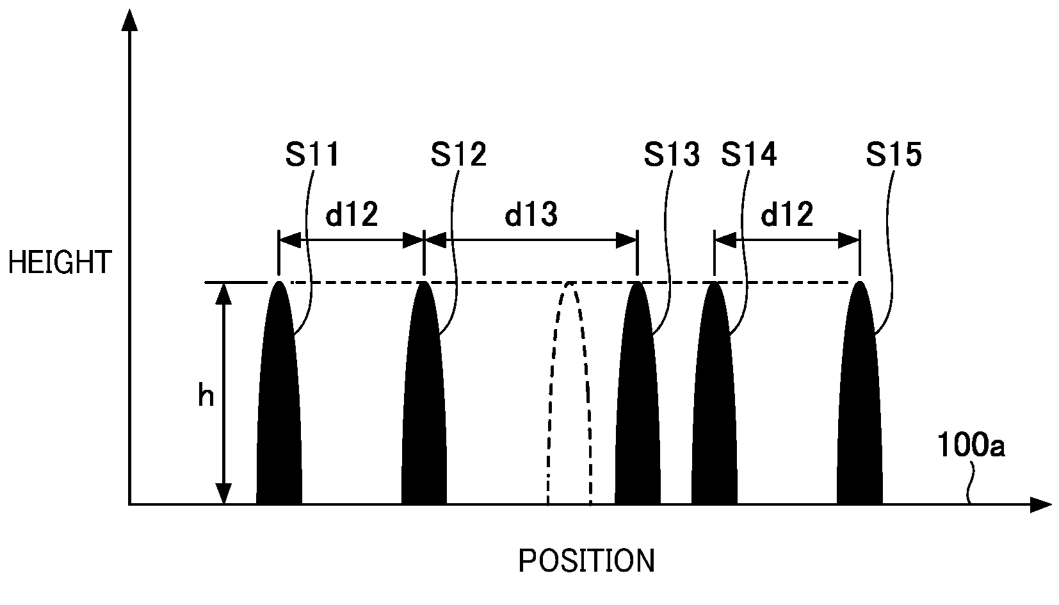
FIG. 14 is a diagram illustrating another second example of the detection of the abnormal discharge of the liquid discharge apparatus according to the first embodiment of the present disclosure.

FIG. 13 is a diagram illustrating another first example of abnormal discharge detection and illustrates a cross-sectional shape of the ink 325 in a case where an ink amount abnormality is detected. FIG. 14 is a diagram illustrating another second example of the abnormal discharge detection and illustrates a cross-sectional shape of the ink 325 in the case of detecting an ink speed abnormality. FIGS. 13 and 14 both illustrate cross-sectional shapes at a position corresponding to the line IX-IX in FIG. 9B.

As illustrated in FIG. 13, shapes S6 to S10 represent the shape of the ink 325 discharged from the five nozzles of the head 300 and applied to the application surface 100*a*. The heights of the shapes S6, S7, S9, and S10 are substantially equal as a height h7. On the other hand, a height h8 of the shape S8 is lower than the height h7.

The height of the ink 325 applied to the application surface 100*a* increases as the ink amount m increases, and conversely, the height of the ink 325 decreases as the ink amount m decreases. Accordingly, the liquid discharge apparatus 1000 can detect that the ink amount m discharged from the nozzle corresponding to the shape S8 is smaller than the ink amount m (predetermined amount) discharged from other nozzles based on the height of the shapes S6 to S10 and can detect the ink amount abnormality of the nozzle corresponding to the shape S8.

As illustrated in FIG. 14, shape S11 to S15 represent the shape of the ink 325 discharged from the five nozzles of the head 300 and applied to the application surface 100*a*. An interval between the shape S11 and the shape S12 and an interval between the shape S14 and the shape S15 are substantially equal as an interval d12. On the other hand, an interval d13 between the shape S12 and the shape S13 is wider than the interval d12.

The head 300 discharges the ink 325 from the nozzle in a predetermined discharge direction. The predetermined discharge direction is, for example, a direction substantially orthogonal to the direction in which the plurality of nozzles are arranged. When the discharge direction of the ink 325 discharged from the nozzle deviates from the predetermined discharge direction, the ink application position on the application surface 100*a* deviates according to the deviation, and the interval between the adjacent ink shapes deviates from the predetermined interval.

Accordingly, the liquid discharge apparatus 1000 can detect that the discharge direction of the ink 325 from the nozzle corresponding to the shape S13 is deviated from the direction (predetermined discharge direction) of the ink 325 discharged from another nozzle from the interval between the adjacent ink shapes based on the shapes S11 to S15 and can detect the abnormality of the ink discharge direction of the nozzle corresponding to the shape 513.

In addition to the above-described example, the liquid discharge apparatus 1000 can detect a liquid speed abnormality in which the discharge speed of the ink 325 discharged from the nozzle deviates from a predetermined discharge speed as an abnormal discharge.

The liquid discharge apparatus 1000 discharges the ink 325 from the head 300 while relatively moving the head 300 and the application surface 100*a*, to apply the ink 325 to the application surface 100*a*. When the discharge speed of the ink 325 discharged from the head 300 deviates from the predetermined speed, the timing at which the ink 325 is applied to the application surface 100*a* deviates from the predetermined timing. Consequently, the ink application position of the discharged ink 325 with respect to the application surface 100*a* deviates from the predetermined position along the relative movement direction (X direction in FIG. 9) of the head 300 and the application surface 100*a*.

The liquid discharge apparatus 1000 can detect that the discharge speed of the ink 325 discharged from the abnormal discharge nozzle is deviated from the discharge speed (predetermined discharge speed) of the ink discharged from another nozzle from the ink application position along the relative movement direction based on the shape of the ink applied to the application surface 100*a* and can detect the abnormality of the ink discharge speed of the nozzle.

Effects of Liquid Discharge Apparatus 1000

A description is given of effects of the liquid discharge apparatus 1000. As known in the art, a read image obtained by reading ink applied to an application surface by a scanner is binarized based on a difference between a color of the application surface and a color of the ink, and an abnormal discharge is detected by comparing the binarized image with a read image at the time of normal discharge.

However, in the art, in a case where the color of the application surface and the color of the ink are the same color or the same type of color, the contrast of the color is not obtained, and the binarization process is not appropriately performed, and then the abnormal discharge may not be detected.

In the present embodiment, the liquid discharge apparatus 1000 includes the head 300 that applies the ink 325 (liquid) discharged from the nozzle to the application surface 100*a*, and the output unit 57 that outputs the abnormal discharge information Ne of the nozzle detected based on the shape of the ink 325 applied to the application surface 100*a*.

For example, the liquid discharge apparatus 1000 includes the sensor 120 that outputs the shape information of the ink 325 applied to the application surface 100*a*, and the output unit 57 outputs the abnormal discharge information Ne of the nozzle detected based on the shape information of the ink 325 output from the sensor 120. The shape information of the ink 325 includes height information of the ink 325 with respect to the application surface 100*a*.

Since the liquid discharge apparatus 1000 detects the abnormal discharge of the nozzle based on the shape of the ink 325 applied to the application surface 100*a*, the liquid discharge apparatus 1000 is not affected by the contrast between the color of the application surface 100*a* and the color of the ink 325. Accordingly, the liquid discharge apparatus 1000 can detect the abnormal discharge of the nozzle with satisfactory accuracy even in a case where the color of the application surface 100*a* and the color of the ink 325 are the same color or the same type of color. As a result, in the present embodiment, the liquid discharge apparatus 1000 excellent in detection accuracy of abnormal discharge can be provided.

For example, when a contrast Ct between a brightness Ct1 of the color of the application surface 100*a* and a brightness Ct2 of the color of the ink 325 satisfies the following Equation 1, it is difficult to detect the abnormal discharge of the nozzle by the method of the related art.

$$Ct=Ct1/Ct2\leq 4 \quad \text{Equation 1}$$

The liquid discharge apparatus 1000 particularly produces excellent effects in a case where the contrast Ct satisfies Equation 1.

However, an application of the present embodiment is not limited to a case where the color of the application surface 100*a* and the color of the ink 325 are the same color or the same type of color. The present embodiment can also be applied to a case where the color of the application surface 100*a* and the color of the ink 325 are different colors and the contrast is high. Since the liquid discharge apparatus 1000 can detect the abnormal discharge of the nozzle without using a scanner or a camera, high detection accuracy of the nozzle abnormal discharge is obtained without being affected by a reading error based on illumination unevenness at the time of reading. In addition, since complicated image processing for image noise removal does not need to be performed, the liquid discharge apparatus 1000 can obtain high detection accuracy of nozzle abnormal discharge by simple processing.

In the present embodiment, a configuration in which the liquid discharge apparatus 1000 includes the head 300, the movement mechanism 110, the sensor 120, and the controller 500 is exemplified. However, components other than the head 300 and the output unit 57 included in the controller 500 may not be included. Since the liquid discharge apparatus 1000 includes at least the head 300 and the output unit 57, the above-described effects can be obtained.

In the present embodiment, the application surface 100*a* preferably has impermeability. In a case where the application surface 100*a* is impermeable, the ink 325 applied to the application surface 100*a* does not permeate into the application surface 100*a* or the object 100. Accordingly, the liquid discharge apparatus 1000 can detect the shape of the ink 325 on the application surface 100*a* with satisfactory accuracy and can obtain high accuracy in detecting abnormal discharge of the nozzle.

In the present embodiment, the abnormal discharge of the nozzle includes at least one of the non-discharge, the ink amount abnormality, ink direction abnormality, or ink discharge speed abnormality. The non-discharge indicates that the ink 325 is not discharged from the nozzle. The ink amount abnormality (liquid amount abnormality) indicates that the amount of the ink 325 discharged from the nozzle deviates from the predetermined amount of ink. The ink direction abnormality (liquid direction abnormality) indicates that the direction of the ink 325 discharged from the nozzle deviates from the predetermined discharge direction. The ink discharge speed abnormality (liquid speed abnormality) indicates that the speed of the ink 325 discharged from the nozzle deviates from the predetermined speed. In the present embodiment, since these abnormal discharges can be detected based on the shape of the ink 325 applied to the application surface 100*a*, the liquid discharge apparatus 1000 can be provided having high versatility with respect to abnormal discharge of the nozzles.

In the present embodiment, the head 300 includes the plurality of nozzles, and the abnormal discharge information Ne of the nozzles includes the abnormal discharge nozzle information Nn of the plurality of nozzles. For example, the head 300 forms the linear patterns L1 to L5 (predetermined pattern) on the application surface 100*a* with the ink 325 discharged from each of the plurality of nozzles. The output unit 57 outputs the abnormal discharge nozzle information Nn identified based on the position (second position) of the shape S3 of the application surface 100*a* at which the height of the ink 325 constituting the linear patterns L1 to L5 formed on the application surface 100*a* with respect to the application surface 100*a* is lower than the height h at each position (first position) of the shapes S1, S2, S4 and S5 of the application surface 100*a*. Accordingly, the liquid discharge apparatus 1000 can detect the abnormal discharge nozzle by comparing with the ink 325 which is discharged from the normal nozzle other than the abnormal discharge nozzle and is applied to the application surface 100*a*. As a result, the liquid discharge apparatus 1000 can easily perform the detection process. On the other hand, since the liquid discharge apparatus 1000 can perform the detection of the abnormal discharge in each of the plurality of nozzles in parallel, the efficiency of the detection operation is improved.

In the present embodiment, the linear patterns L1 to L5 include a plurality of linear patterns which are formed on the application surface 100*a* by the ink 325 discharged from the plurality of nozzles 321*a* to 321*e* and which extend in the X direction (pattern extending direction). The pattern extending direction is preferably a direction in which the head 300 is relatively moved with respect to the application surface 100*a* while the head 300 is discharging the ink 325 to the application surface 100*a*. Since the linear pattern is easy to recognize an abnormal discharge when the abnormal discharge occurs, the liquid discharge apparatus 1000 can easily detect the abnormal discharge of the nozzle by detecting the abnormal discharge of the nozzle based on the shape of the ink 325 in the plurality of linear patterns.

In the present embodiment, the liquid discharge apparatus 1000 includes the movement mechanism 110 which relatively moves the head 300 and the application surface 100*a* along the surfaces of the application surface 100*a*, and the movement control unit 55 which controls the relative movement by the movement mechanism 110. The movement control unit 55 controls the relative movement speed v by the movement mechanism 110 to control the height h of the ink 325 with respect to the application surface 100*a*.

For example, the movement control unit 55 reduces the relative movement speed v as the amount of the ink 325 discharged from the head 300 decreases. The movement control unit 55 also reduces the relative movement speed v as the surface tension of the ink 325 discharged from the head 300 reduces. In addition, the movement control unit 55 reduces the relative movement speed v as the viscosity of the ink 325 discharged from the head 300 is lower.

As the relative movement speed v decreases, the ink 325 applied to the application surface 100*a* is overlapped and becomes higher with respect to the application surface 100*a*. For example, in a case where the height h sufficient for the abnormal discharge detection is not obtained due to wetting and spreading of the ink 325 on the application surface 100*a*, the liquid discharge apparatus 1000 performs control such that the relative movement speed v becomes slow. As the result, the liquid discharge apparatus 1000 can obtain the height h of the ink 325 sufficient for the abnormal discharge detection and can obtain high detection accuracy of the nozzle abnormal discharge.

In the present embodiment, the liquid discharge apparatus 1000 includes the discharge control unit 53 that controls the amount of the ink 325 to be discharged from the head 300 to control the height of the ink 325 with respect to the application surface 100*a*.

For example, the discharge control unit 53 increases the amount of the ink 325 to be discharged from the head 300 as the surface tension of the ink 325 reduces. In addition, the discharge control unit 53 increases the amount of the ink 325 to be discharged from the head 300 as the viscosity of the ink 325 is lower.

As the amount of the ink 325 discharged from the head 300 increases, the height of the ink 325 applied to the application surface 100*a* becomes higher with respect to the application surface 100*a*. For example, in a case where the ink 325 easily wets and spreads on the application surface 100*a* and the sufficient height h for abnormal discharge detection is not obtained, the liquid discharge apparatus 1000 performs control such that the amount of the ink 325 discharged from the head 300 is increased. As a result, the liquid discharge apparatus 1000 can obtain the height h of the ink 325 sufficient for the abnormal discharge detection and can obtain high detection accuracy of the nozzle abnormal discharge.

Second Embodiment

Next, a liquid discharge apparatus 1000*a* according to a second embodiment is described. Note that the same components as the components described in the first embodiment are denoted by the same reference numerals, and redundant description is omitted as appropriate.

In the present embodiment, the head 300 is configured to discharge a plurality of times so that the ink 325 is stacked in the height direction on the application surface 100*a*, and the output unit 57 outputs the abnormal discharge information Ne of the nozzle detected based on the shape of the ink 325 stacked on the application surface 100*a*.

Figure 15:
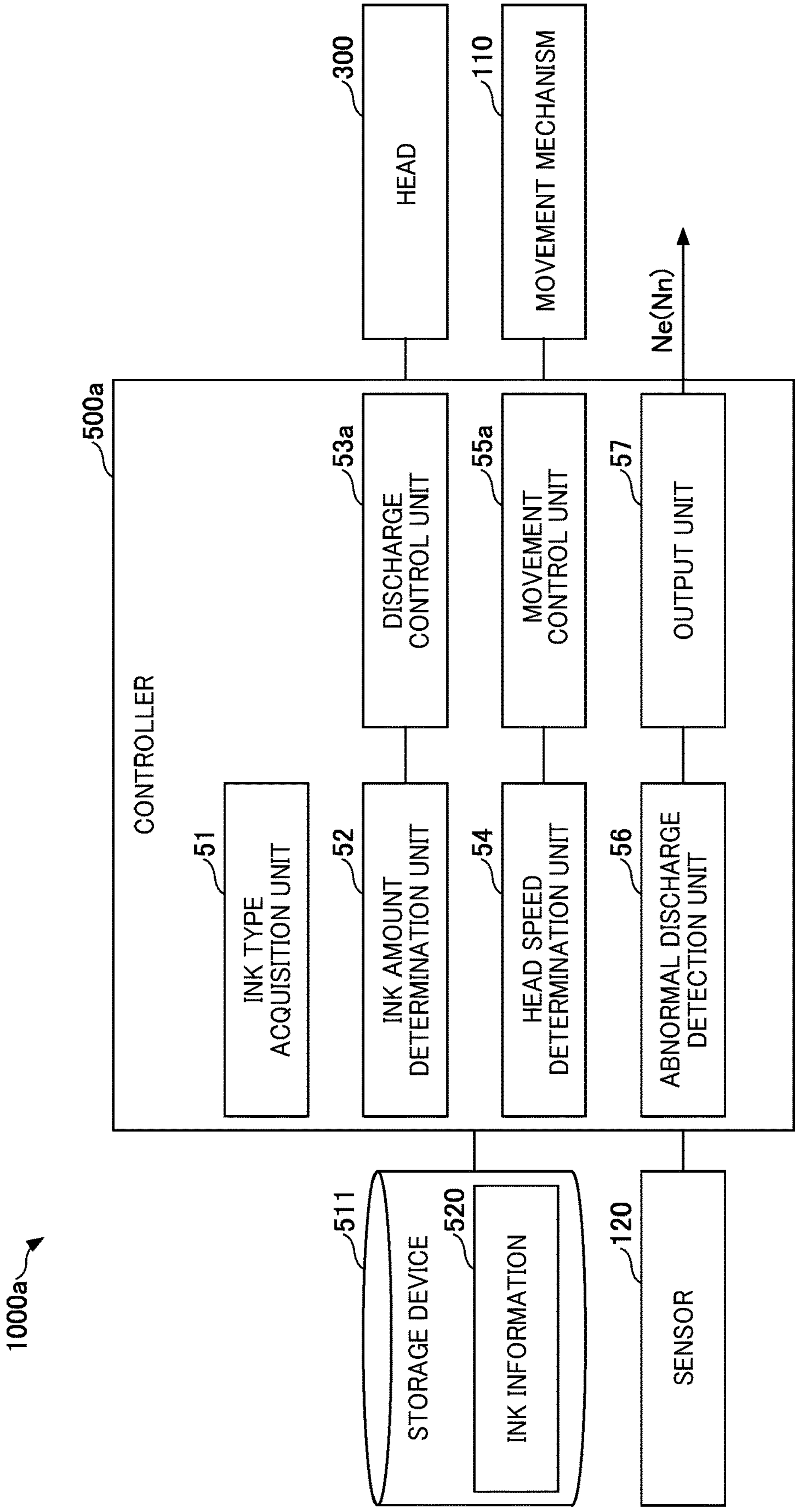
FIG. 15 is a diagram illustrating a functional configuration of a controller of the liquid discharge apparatus according to a second embodiment of the present disclosure.

FIG. 15 is a block diagram illustrating an example of the functional configuration of a controller 500*a* included in the liquid discharge apparatus 1000*a* according to the present embodiment. The controller 500*a* includes a discharge control unit 53*a* and a movement control unit 55*a*.

The discharge control unit 53*a* causes the head 300 to perform discharge a plurality of times so that the ink 325 is stacked in the height direction on the application surface 100*a*. The movement control unit 55*a* controls the relative movement between the head 300 and the application surface 100*a* by the movement mechanism 110 so that the ink 325 discharged a plurality of times by the head 300 is stacked in the height direction.

The output unit 57 outputs the abnormal discharge information Ne of the nozzle that is detected based on the shape of the ink 325 stacked in the height direction on the application surface 100*a* by the control of the discharge control unit 53*a*.

Figure 16C:
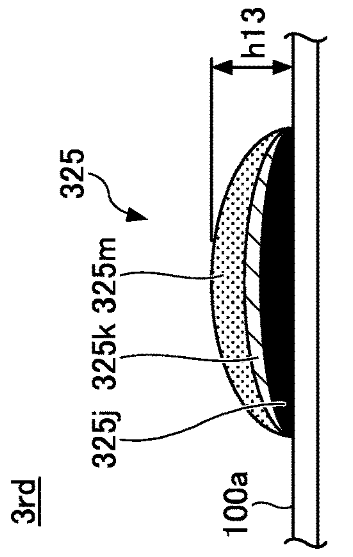
FIGS. 16A, 16B and 16C are diagrams illustrating the heights of the ink according to the second embodiment of the present disclosure.
Figure 16B:
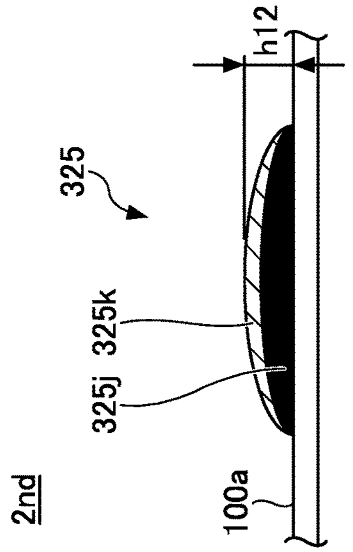
Figure 16A:
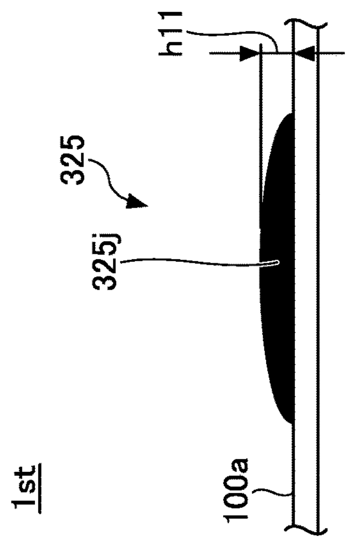

FIGS. 16A to 16C are diagrams illustrating examples of the height of the ink 325 applied to the application surface 100*a* by the liquid discharge apparatus 1000*a*. FIGS. 16A to 16C illustrate states in which the ink 325 discharged three times from the head 300 is stacked on the application surface 100*a*.

FIG. 16A illustrates the first discharge of the ink 325, and ink 325*j* is applied to the application surface 100*a*. The height of the ink 325 with respect to the application surface 100*a* is a height h11.

FIG. 16B illustrates the second discharge of the ink 325, and ink 325*k* is applied onto the ink 325*j* applied to the application surface 100*a*. As a result of stacking the ink 325*j* and the ink 325*k*, the height of the ink 325 with respect to the application surface 100*a* becomes a height h12, which is higher than the height h11.

FIG. 16C illustrates the third discharge of the ink 325, and ink 325*m* is applied onto the ink 325*j* and the ink 325*k* applied to the application surface 100*a*. As a result of stacking the ink 325*j*, the ink 325*k*, and the ink 325*m*, the height of the ink 325 with respect to the application surface 100*a* becomes a height h13, which is further higher than the height h12.

As described above, in the present embodiment, the head 300 performs discharge a plurality of times so that the ink 325 is stacked in the height direction on the application surface 100*a*. The output unit 57 outputs the abnormal discharge information Ne of the nozzle that is detected based on the shape of the ink 325 stacked on the application surface 100*a*. Accordingly, the liquid discharge apparatus 1000*a* can obtain the sufficient height h of the ink 325 for detecting abnormal discharge and can obtain high detection accuracy of the nozzle abnormal discharge. Note that the other effects of the configuration according to Second Embodiment are the same as the effects of the configuration according to the first embodiment.

OTHER EMBODIMENTS

The liquid discharge apparatus 1000 or the liquid discharge apparatus 1000*a* can be applied to various uses.

Figure 17:
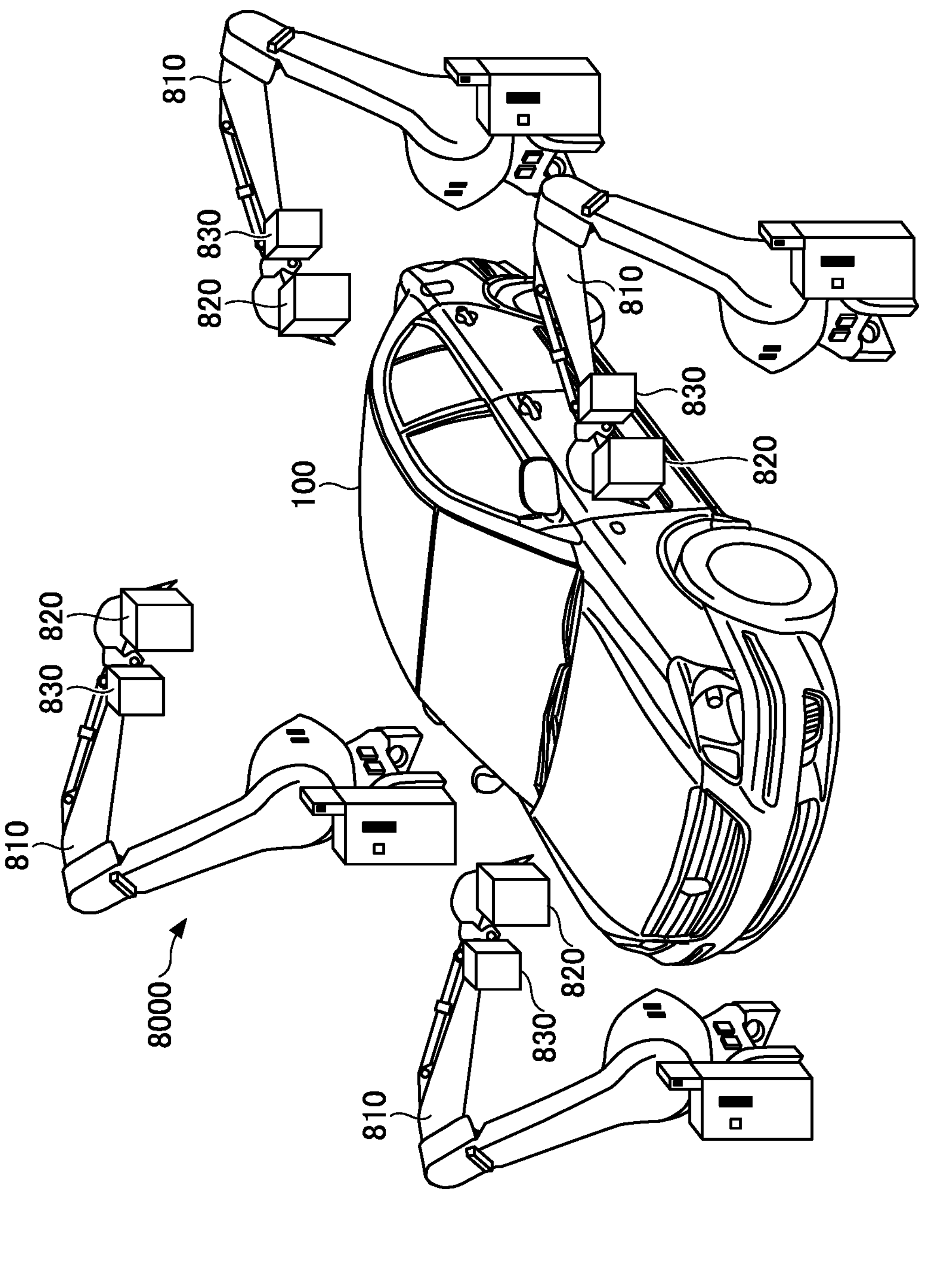
FIG. 17 is a diagram illustrating of an example of application of the liquid discharge apparatus to a painting robot according to the embodiments of the present disclosure.

FIG. 17 is a diagram illustrating an example of application of the liquid discharge apparatus 1000 to a painting robot 8000. The painting robot 8000 paints a vehicle body (body) of an automobile.

The painting robot 8000 includes a robot arm 810 that can freely move like human arms by a plurality of joints and includes a head 820 that discharges ink from a leading end of the robot arm 810. The robot arm 810 includes a three-dimensional (3D) sensor 830 disposed close to the head 820.

As the painting robot 8000, an articulated robot can be used that has an appropriate number of axes such as five axes, six axes, or seven axes. The painting robot 8000 detects a position of the head 820 with respect an object 100 (vehicle body in the present embodiment) by the 3D sensor 830 and moves the robot arm 810 based on the result of the detection to paint the object 100. In this case, the head 300 according to the embodiments of the present disclosure can be used as the head 820.

Although the embodiments have been described above, embodiments of the present disclosure are not limited to the above embodiments. In other words, various modifications and improvements can be made within the scope of the present disclosure.

In the embodiments of the present disclosure, for example, a liquid to be discharged from the head 300 may include a solution, a suspension, an emulsion, or an ultraviolet curable ink that contains, for example, a solvent, such as water or an organic solvent, a colorant, such as dye or pigment, a functional material, such as a polymerizable compound, a resin, or a surfactant, a biocompatible material, such as deoxyribonucleic acid (DNA), amino acid, protein, or calcium, or an edible material, such as a natural colorant. These liquids can be used for, e.g., inkjet ink, coating paint, surface treatment solution, a liquid for forming components of electronic element or light-emitting element or a resist pattern of electronic circuit, or a material solution for three-dimensional fabrication.

The object 100 having the application surface 100*a* is a material to which liquid is attached and firmly adheres or an object to which liquid is attached and penetrates. Specific examples of the material include, but are not limited to, a recording medium such as a vehicle body, building material, a sheet, recording sheet, a recording sheet of paper, a film, or cloth, an electronic component such as an electronic substrate or a piezoelectric element, and a medium such as layered powder, an organ model, or a testing cell. The material includes any material to which liquid is adhered, unless particularly limited.

The embodiments of the present disclosure also include a liquid discharge method. For example, the liquid discharge method is a method of discharging a liquid using a liquid discharge apparatus that applies the liquid to an application surface. The liquid discharge apparatus is configured to apply the liquid discharged from a nozzle to the application surface using a head and is configured to output abnormal discharge information of the nozzle detected based on a shape of the liquid applied to the application surface using an output unit. Such a liquid discharge method as described above can achieve operational effects equivalent to those of the above-described liquid discharge apparatus.

The embodiments of the present disclosure also include a storage medium storing computer-readable program instructions and a computer-readable program product. For example, a program is a program that causes a liquid discharge apparatus to execute a process that the liquid discharge apparatus applies a liquid discharged from a nozzle to an application surface by a head and output abnormal discharge information of the nozzle detected based on a shape of the liquid applied to the application surface by an output unit. The storage medium or a computer-readable program product including such program instructions can provide effects equivalent to those of the above-described liquid discharge apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A liquid discharge apparatus to apply liquid to an application surface, the liquid discharge apparatus comprising:
 a head configured to apply the liquid discharged from a nozzle to the application surface; and
 processing circuitry configured to control the head during relative movement between the head and the application surface to form a linear pattern of the liquid on the application surface extending in a pattern extending direction, and to output abnormal discharge information of the nozzle detected based on a shape of the liquid, as applied to the application surface in the linear pattern, along a line substantially orthogonal to the pattern extending direction.

2. The liquid discharge apparatus according to claim 1, further comprising a sensor configured to output shape information of the liquid applied to the application surface,
 wherein the processing circuitry is configured to output the abnormal discharge information of the nozzle detected based on the shape information output from the sensor.

3. The liquid discharge apparatus according to claim 2, wherein the shape information of the liquid includes height information of the liquid with respect to the application surface.

4. The liquid discharge apparatus according to claim 1, wherein a value of a contrast obtained by dividing a color brightness of the application surface by a color brightness of the liquid is equal to or smaller than four.

5. The liquid discharge apparatus according to claim 1, wherein the application surface is impermeable.

6. The liquid discharge apparatus according to claim 1,
 wherein the head is configured to discharge the liquid a plurality of times to stack the liquid in a height direction on the application surface, and
 wherein the processing circuitry is configured to output the abnormal discharge information of the nozzle detected based on the shape of the liquid stacked on the application surface.

7. The liquid discharge apparatus according to claim 1,
 wherein an abnormal discharge of the nozzle includes at least one of a non-discharge, a liquid amount abnormality, a liquid direction abnormality, or a liquid speed abnormality,
 wherein the non-discharge indicates that the liquid is not discharged from the nozzle,
 wherein the liquid amount abnormality indicates that an amount of the liquid discharged from the nozzle deviates from a predetermined amount of liquid,
 wherein the liquid direction abnormality indicates that a direction of the liquid discharged from the nozzle deviates from a predetermined discharge direction, and
 the liquid speed abnormality indicates that a speed of the liquid discharged from the nozzle deviates from a predetermined speed.

8. The liquid discharge apparatus according to claim 1,
 wherein the head has a plurality of nozzles, and
 wherein the abnormal discharge information of the nozzle includes information to identify an abnormal discharge nozzle among the plurality of nozzles.

9. The liquid discharge apparatus according to claim 8,
 wherein the head is configured to form the linear pattern on the application surface with the liquid discharged from each of the plurality of nozzles,
 wherein the application surface includes a first position and a second position at which a height of the liquid in the linear pattern formed on the application surface with respect to the application surface is lower than the height of the liquid at the first position, and
 wherein the processing circuitry is configured to output abnormal discharge nozzle information identified based on the second position of the application surface.

10. The liquid discharge apparatus according to claim 3, wherein the processing circuitry is configured to output the abnormal discharge information of the nozzle when the height information indicates a height of the liquid is less than a predetermined height.

11. The liquid discharge apparatus according to claim 1, further comprising a movement mechanism configured to relatively move the head and the application surface along a surface of the application surface,
 wherein the processing circuitry is configured to:
  control a relative movement by the movement mechanism; and
  control a relative movement speed of the movement mechanism.

12. The liquid discharge apparatus according to claim 11, wherein the processing circuitry is configured to reduce the relative movement speed as an amount of the liquid discharged from the head is smaller.

13. The liquid discharge apparatus according to claim 11, wherein the processing circuitry is configured to reduce the relative movement speed as surface tension of the liquid discharged from the head is lower.

14. The liquid discharge apparatus according to claim 11, wherein the processing circuitry is configured to reduce the relative movement speed as viscosity of the liquid discharged from the head is lower.

15. The liquid discharge apparatus according to claim 1, wherein the processing circuitry is configured to control an amount of the liquid discharged from the head to control a height of the liquid with respect to the application surface.

16. The liquid discharge apparatus according to claim 15, wherein the processing circuitry is configured to increase the amount of the liquid discharged from the head as surface tension of the liquid is lower.

17. The liquid discharge apparatus according to claim 15, wherein the processing circuitry is configured to increase the amount of the liquid discharged from the head as viscosity of the liquid is lower.

18. A liquid discharge method to be executed by a liquid discharge apparatus that applies liquid to an application surface, the method comprising:
 applying the liquid discharged from a nozzle to the application surface by a head;
 controlling, with processing circuitry, the head during relative movement between the head and the application surface to form a linear pattern of the liquid on the application surface extending in a pattern extending direction; and
 outputting, with the processing circuitry, abnormal discharge information of the nozzle detected based on a shape of the liquid, as applied to the application surface in the linear pattern, along a line substantially orthogonal to the pattern extending direction.

19. A non-transitory, computer-readable storage medium storing computer-readable program code that causes a liquid discharge apparatus that applies liquid to an application surface, to perform:

applying the liquid discharged from a nozzle to the application surface by a head;

controlling, with processing circuitry, the head during relative movement between the head and the application surface to form a linear pattern of the liquid on the application surface extending in a pattern extending direction; and outputting, with the processing circuitry, abnormal discharge information of the nozzle detected based on a shape of the liquid, as applied to the application surface in the linear pattern, along a line substantially orthogonal to the pattern extending direction.

20. The liquid discharge apparatus according to claim 1, further comprising a sensor configured to project light having a stripe pattern toward the liquid applied to the application surface, and outputs shape information of the liquid applied to the application surface based on distortion of the stripe pattern by the liquid, wherein the processing circuitry is configured to output the abnormal discharge information of the nozzle detected based on the shape information output from the sensor.

* * * * *